US010230315B2

(12) United States Patent
Ramezani

(10) Patent No.: US 10,230,315 B2
(45) Date of Patent: Mar. 12, 2019

(54) USE OF BATTERY AS THE DC POWER SOURCE IN PORTABLE/EXPANDABLE OR FIXED CONVEYORS TO DRIVE DC MOTORS

(71) Applicant: Kamran Ramezani, La Jolla, CA (US)

(72) Inventor: Kamran Ramezani, La Jolla, CA (US)

(*) Notice: Subject to any disclaimer, the term of this patent is extended or adjusted under 35 U.S.C. 154(b) by 0 days.

(21) Appl. No.: 15/583,285

(22) Filed: May 1, 2017

(65) Prior Publication Data

US 2017/0313522 A1    Nov. 2, 2017

Related U.S. Application Data

(60) Provisional application No. 62/330,257, filed on May 2, 2016.

(51) Int. Cl.
| | | |
|---|---|---|
| *B65G 21/14* | (2006.01) | |
| *B65G 23/00* | (2006.01) | |
| *H02P 5/68* | (2006.01) | |
| *H02J 9/06* | (2006.01) | |

(52) U.S. Cl.
CPC ............... *H02P 5/68* (2013.01); *B65G 21/14* (2013.01); *B65G 23/00* (2013.01); *H02J 9/061* (2013.01); *H02J 9/06* (2013.01)

(58) Field of Classification Search
CPC ......... B65G 21/14; B65G 21/16; B65G 15/26
USPC .................................. 198/588, 594, 812
See application file for complete search history.

(56) References Cited

U.S. PATENT DOCUMENTS

| | | | |
|---|---|---|---|
| 3,918,574 A | | 11/1975 | Allison |
| 5,147,025 A | * | 9/1992 | Flippo .................. B65G 13/07 193/35 TE |
| 5,636,728 A | | 6/1997 | Best et al. |
| 5,664,929 A | * | 9/1997 | Esaki ..................... B60L 11/18 191/1 R |
| 5,690,209 A | * | 11/1997 | Kofoed ................ B65G 17/345 198/370.03 |
| 5,912,541 A | | 6/1999 | Bigler et al. |
| 6,206,181 B1 | | 3/2001 | Syverson |

(Continued)

FOREIGN PATENT DOCUMENTS

| | | |
|---|---|---|
| EP | 1086522 A1 | 3/2001 |
| EP | 2664563 A1 | 11/2013 |
| WO | 99/65134 A1 | 12/1999 |

OTHER PUBLICATIONS

Potentially related U.S. Appl. No. 15/459,649, filed Mar. 15, 2017.
(Continued)

*Primary Examiner* — James R Bidwell
(74) *Attorney, Agent, or Firm* — The Dobrusin Law Firm, PC

(57) ABSTRACT

A motorized conveyor system comprising: (a) one or more electrical motors that create movement in the conveyor system; (b) one or more rechargeable batteries that power the one or more electrical motors in the conveyor system; (c) one or more rollers that are driven by the one or more electrical motors; (d) two frames holding the one or more rollers driven by the one or more electrical motors; (e) one or more motor control electronic circuitry elements connected to the one or more rechargeable batteries; and (f) charging system circuitry connected to the one or more rechargeable batteries.

20 Claims, 7 Drawing Sheets

(56) References Cited

U.S. PATENT DOCUMENTS

| | | | |
|---|---|---|---|
| 6,244,427 B1 | 6/2001 | Syverson | |
| 6,288,470 B1 | 9/2001 | Breit | |
| 6,420,846 B1 | 7/2002 | Wolfe | |
| 6,455,960 B1 | 9/2002 | Trago et al. | |
| 6,570,351 B2 | 5/2003 | Miyazaki et al. | |
| 6,710,505 B1 | 3/2004 | Barani et al. | |
| 6,794,788 B1 | 9/2004 | Smith et al. | |
| 6,902,446 B1 | 6/2005 | Healey | |
| 7,102,318 B2 | 9/2006 | Miura et al. | |
| 7,166,981 B2 | 1/2007 | Kakutani et al. | |
| 7,299,915 B2 * | 11/2007 | El-Ibiary | B65G 23/08 198/780 |
| 7,500,556 B2 * | 3/2009 | Lemke | B65G 13/12 198/588 |
| 7,537,107 B2 | 5/2009 | Hall | |
| 7,671,551 B2 | 3/2010 | Bi et al. | |
| 8,757,363 B2 | 6/2014 | Combs et al. | |
| 9,004,263 B2 | 4/2015 | Hall et al. | |
| 9,490,738 B2 | 11/2016 | Nondahl et al. | |
| 2003/0089580 A1 | 5/2003 | Pfeiffer | |
| 2005/0109584 A1 * | 5/2005 | Hayashi | B65G 23/08 198/780 |
| 2007/0114861 A1 | 5/2007 | Bott et al. | |
| 2009/0135019 A1 * | 5/2009 | Smith | B65G 43/00 340/679 |
| 2012/0152699 A1 * | 6/2012 | Yang | B65G 21/14 198/812 |
| 2013/0134017 A1 | 5/2013 | Hall et al. | |
| 2013/0277175 A1 | 10/2013 | Campbell et al. | |

OTHER PUBLICATIONS

Potentially related U.S. Appl. No. 15/475,553, filed Mar. 31, 2017.
Potentially related U.S. Appl. No. 15/495,208, filed Apr. 24, 2017.

* cited by examiner

US 10,230,315 B2

USE OF BATTERY AS THE DC POWER SOURCE IN PORTABLE/EXPANDABLE OR FIXED CONVEYORS TO DRIVE DC MOTORS

FIELD

The present teachings generally relate to a power storage device that powers an expandable, flexible, moveable, or fixed conveyor system; the power storage device may power a motor when the power storage device is connected to an external power source; the power storage device may power a motor free of an external power source; the power storage device may include a controller; the power storage device may include a converter to convert power from AC to DC; the power storage device may include rechargeable battery system; the power storage device may replace the regularly used DC power supply in the conveyor system and be able to carry the occasional high loads without additional cost of otherwise using an over-rated DC power supply.

BACKGROUND

Conveyor systems are used through industries for many reasons such as loading or unloading a truck, moving articles within a machine or factory, or moving articles to a secondary packing location. Conveyor systems typically include a plurality of rollers so that as an article such as a box is placed on the conveyor system, the article can be moved without lifting the article as the article moves between two locations. Some conveyor systems only include free rolling rollers that allow an article to move using gravity, a push from a user, or another article pushing a first article down the conveyor. Some conveyor systems are motorized so that one or more of the rollers rotate to move an article along the conveyor system. These conveyor systems generally include a motor connected to, or integrated into, one or more of the rollers that is suspended from a conveyor frame that rotates one or more of the rollers. The one or more rotated rollers may be coupled to other rollers so that multiple rollers are driven by a motor. These motors are generally connected using wires to a fixed power source such as a building power outlet or main power feed. An extension cord may be used to power the motors when the conveyor system is movable and/or expandable/contractible.

Examples of conveyor systems may be found in U.S. Pat. Nos. 3,918,574; 5,636,728; 6,206,181; and 9,004,263; U.S. Patent Application Publication No. 2013/0277175, all of which are incorporated by reference herein for all purposes. It would be attractive to have a power storage device to store energy to power a conveyor system. What is needed is a power storage device that includes a power module that charges the power storage device when connected to an external power source. It would be attractive to have a power storage device that powers a conveyor system when the power storage device, motor, or both free of connection to an external power source. What is needed is a power storage device that includes a controller to change a power feed from an external fixed power source to the power storage device. It would be attractive to have a power storage device that converts AC power to DC. What is needed is a power storage device that is an uninterruptable power supply and supplies power when the conveyor system is disconnected from an external power source, power is off, or both.

SUMMARY

The present teachings meet one or more of the present needs by providing: a motorized conveyor system comprising: (a) one or more electrical motors that create movement in the conveyor system; (b) one or more rechargeable batteries that power the one or more electrical motors in the conveyor system; (c) one or more rollers that are driven by the one or more electrical motors; (d) two frames holding the one or more rollers driven by the one or more electrical motors; (e) one or more motor control electronic circuitry elements connected to the one or more rechargeable batteries; and (f) charging system circuitry connected to the one or more rechargeable batteries.

The present teachings meet one or more of the present needs by providing: a conveyor system comprising: (a) a frame; (b) a plurality of rollers connected to the frame so that each of the plurality of rollers rotate when an article is moved along the frame, wherein at least one of the plurality of rollers is a master roller; and (c) a power storage device connected to the master roller and providing power to the master roller so that the master roller moves when power is applied; and wherein a brushless direct current motor drives the master roller.

The present teachings provide: a conveyor system comprising: (a) a frame; (b) a plurality of rollers connected to the frame so that each of the plurality of rollers rotate when an article is moved along the frame, wherein a plurality of rollers is a master roller; and (c) a power storage device connected to each of the master rollers and providing power to the master rollers so that the master rollers moves when power is applied; and wherein a brushless direct current motor drives each of the master roller.

The present teachings provide: a conveyor system comprising: (a) a frame; (b) a plurality of rollers connected to the frame so that each of the plurality of rollers rotate when an article is moved along the frame, wherein at least one of the plurality of rollers is a master roller; and (c) a power storage device connected to the master roller and providing power to the master roller so that the master roller moves when power is applied; and wherein the master roller is a brushless direct current motor that supports one or more articles for movement on the conveyor system.

The present teachings provide: a power storage device to store energy to power a conveyor system. The present teachings provide a power storage device that includes a power module that charges the power storage device when connected to an external power source. The present teachings provide a power storage device that powers a conveyor system when the power storage device, motor, or both free of connection to an external power source. The present teachings provide a power storage device that includes a controller to change a power feed from an external fixed power source to the power storage device. The present teachings provide a power storage device that converts AC power to DC. The present teachings provide a power storage device that is an uninterruptable power supply and supplies power when the conveyor system is disconnected from an external power source, power is off, or both.

DETAILED DESCRIPTION

Figure 1:
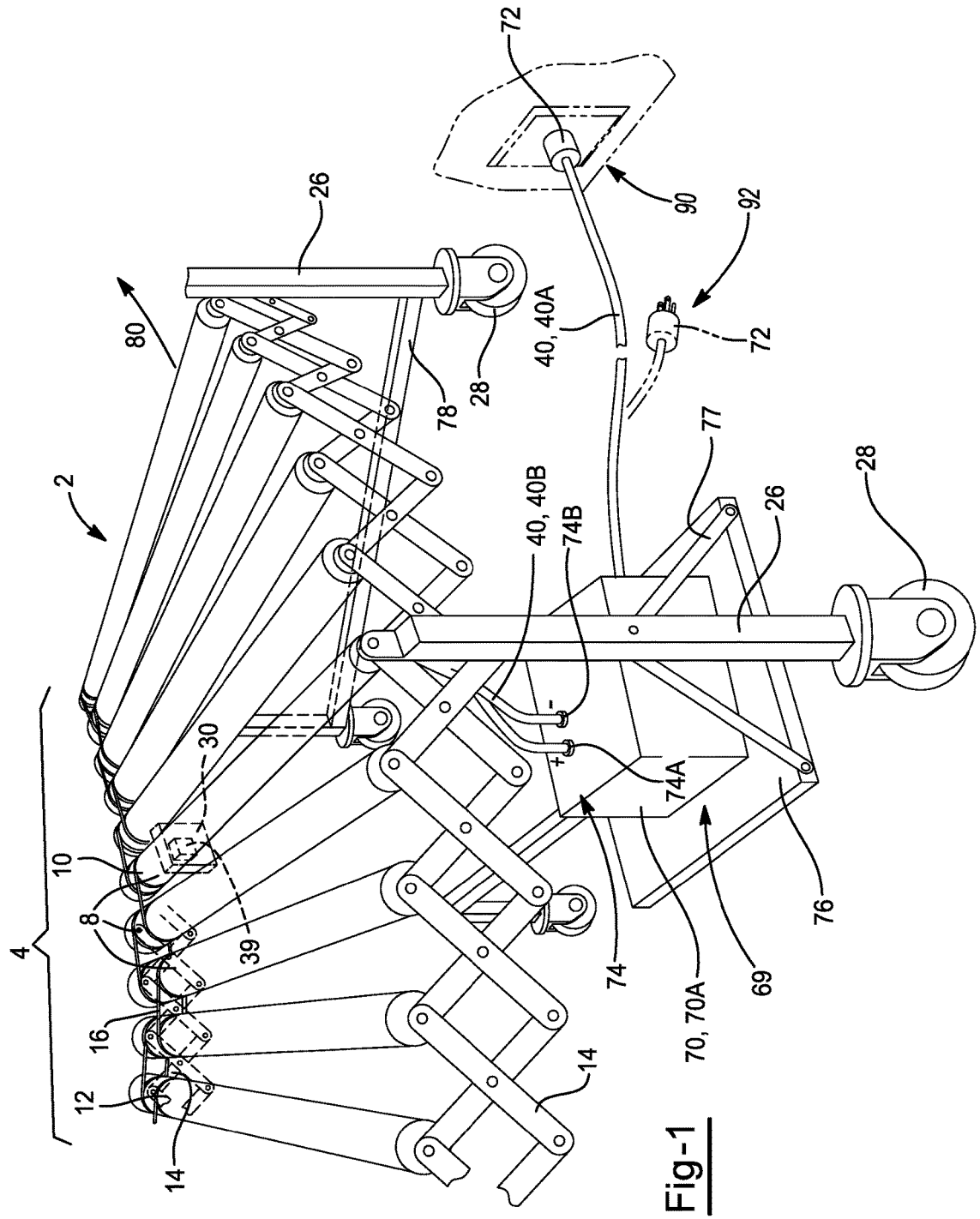
FIG. 1 is a perspective view of a movable conveyor system including a power storage device and a motor.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings relate to a power storage device that is connected to a motor, a controller, or both. The motor and controller may connected to a machine that includes a frame or located between two or more frame members. Preferably, the power storage device may be part of a conveyor system and may power one or more motors, one or more controllers, or a combination of both. Most preferably, the power storage device may be a rechargeable battery and may be part of a conveyor system and may power one or more motors, one or more controllers, or a combination of both. The power storage device, the motor, and the controller may be located proximate to or in contact with the frame members so that the frame members act as a heat sink for the controller components, the motor, or both. Preferably, the motor and controller are mounted to a frame member so that heat transfers through the wall directly to the frame removing heat from the motor and controller, and the power storage device is mounted to a support of the frame members. Even more preferably, the motor and controller are integrated into one of the rollers that act as a master roller, and the power storage device is mounted to the frame members. The machine may be any machine that has a motor and controller directly connected thereto for moving one or more components of the machine. The machine may be any machine that includes a frame that supports the motor and controller. The machine may be a non-conveyor system. The machine may be any machine used to form or smooth a material, such as a calender for pressing paper. The machine may be a printing press. The machine may be any machine that has a drum such as a dryer in a paper machine or a paint mixer. Preferably, the machine may be a conveyor system.

The conveyor system functions to move articles between two locations. The conveyor system may move items out of a truck, into a truck, within a factory or warehouse, from machine to machine, or a combination thereof. The conveyor system may move perishable items, non-perishable items, or both. The conveyor system may have one or more interconnected rollers that are driven by a single motor receiving power from a power source, power storage device, or a combination of both. Preferably, the conveyor system may include a plurality of rollers that are connected together by one or more transfer devices. The conveyor system may be a roller conveyor, a belt conveyor, or a combination of both. The conveyor system may include one or more roller conveyors.

The one or more roller conveyors may function to directly contact an article so that the article moves along the rollers. The one or more roller conveyors may include one or more master rollers and one or more slave rollers. Preferably, each zone of the roller conveyors includes one master roller and a plurality of slave rollers. The conveyor system may include a plurality of master rollers and a plurality of slave rollers. The roller conveyors may be one section within a conveyor section. The roller conveyors may include a plurality of rollers that are connected by a transfer device that covers a portion of each roller and transfers force, torque, or both from one roller to another roller. The one or more roller conveyors may include one or more transfer devices that are located at a single end of the rollers. The roller conveyors may have exposed rollers versus a belt conveyor that includes a transfer device that substantially covers the rollers.

The one or more belt conveyors may function to move an article along the conveyor system by supporting the article on a transfer device (e.g., conveyor belt or treadmill) that is supported by the rollers. The one or more belt conveyors may include a single transfer device in each zone that moves articles. The one or more belt conveyors may include one or more master rollers that drive each transfer device. The one or more master rollers may be connected to a single power storage device. The one or more master rollers may be connected to a plurality of power storage devices. The one or more belt conveyors may carry an article along the transfer device and the transfer device may be supported by one or more rollers (e.g., slave rollers), one or more support devices (e.g., a low friction support), or both that are located under the transfer device. The one or more belt conveyors, the one or more roller conveyors, or both may include one or more zones.

The one or more zones may operate independently of one another. Each of the zones may include one or more master rollers. Each zone may include a plurality of slave rollers, one or more support devices, or both. Each zone may be driven by one or more master rollers that provide power, torque, or both to a plurality of slave rollers via one or more transfer devices. Each zone may include a power storage device to power the master rollers. A single zone may include a power storage device that powers a master roller in each zone. A single zone may include a power storage device that powers one or more master rollers of one or more additional zones. The zones may each be operated at different speeds. The zones may be interchangeably connected to create a conveyor system. For example, one or more zones with a conveyor belt system may be connected to one or more additional zones with a conveyor belt system, one or more zones with a roller system, or a combination thereof. The zones may communicate with one another via one or more controllers.

One or more controllers may be located within each zone, in connection with a motor, in connection with a master roller, in connection with a power storage device, or a combination thereof. Each of the one or more controllers may communicate with one another. The one or more controllers may be located within a master roller and in connection with the stator, the rotor, or both. The one or more controllers may be located in the power storage device. The one or more controllers located in the power storage device may be connected to the one or more controllers located in the master roller and communicate different information. For example, the one or more controllers in the power storage device may determine when to disperse power to the master rollers, while the one or more controllers in the master rollers may determine when to begin the motor in the master rollers. The one or more controllers may operate a plurality of stators, rotors, or both. The one or more controllers may be located within an end cap of a motor. The one or more controllers may operate each zone. A single controller may control all of the zones, all of the master rollers, or both. The one or more controllers may control the motor of each zone. Each motor may have a standalone controller. The one or more controllers may communicate from one zone to another zone. The plurality of controllers may be a master controller and one or more slave controllers. The master controller may provide instructions to a plurality of slave controllers. The master controller may be located proximate to or in one or more motors. The master controller may be located separate from the motor. The slave controllers may be located proximate to the motors. The master roller may be located at a central location and in communication with the slave controllers. The master controller and slave controllers may be in communication via a wire, wirelessly, or a combination of both. The plurality of controllers may be in communication with each other or the motors via Wi-Fi, Bluetooth, or both. The controllers may be in communication with a detection device to control the motor. The detection device may be a laser, sensor, photocell, a motor position sensor, Hall Effect sensor, rotary encoder, a resolver, or a combination thereof that detects a sustained presence of an object on the conveyor and stops the motor while the detection device detects the presence of an objection, detects motion of the rotor relative to the stator to stop the motor, or both.

The controller may include a printed circuit board. The printed circuit board may include one or more power switching devices. The one or more power switching devices may be a metal-oxide semiconductor field-effect transistor (MOSFET); transistor; insulated gate bipolar transistor (IGBT); rectifier; triode for alternating current (TRIAC); bipolar junction transistor (BJT); or a combination thereof. The one or more power switching devices may produce heat during operation. The one or more power switching devices may be connected to the printed circuit board and may be directly or indirectly in contact with the controller housing, the motor housing, or both. The one or more power switching devices may be in communication with the frame via a wall of the controller housing, the motor housing, or both. The frame may function as a heat sink for the power switching devices. The one or more power switching devices may directly contact a wall. The one or more power switching devices may be in contact with a wall via a thermal grease, a thermal adhesive, or both. The power switching devices may be circuitry that is connected to a printed circuit board.

The printed circuit board may include one or more capacitors, one or more resistors, one or more diodes; one or more inductors; one or more microprocessors; one or more switches, one or more thermistors, a converter, an inverter, or a combination thereof. The printed circuit board may be connected to the motor housing, controller housing, power storage device housing, a wall, or a combination thereof via one or more fasteners. The printed circuit board may be free of direct contact with the motor housing, controller housing, power storage device housing, a wall, or a combination thereof. The circuity may include surface mounted circuitry. The printed circuit board may be directly mounted to or in contact with a motor housing, controller housing, power storage device housing, a wall, or a combination thereof. The printed circuit board may contact a motor housing, controller housing, power storage device housing, a wall, or a combination thereof through the one or more power switching devices. The controllers may include memory, a processor, a motor controller, a network interface, terminal block, power supply, wired power source, capacitor, zone selector, a position sensor, or a combination thereof. Some of the one or more controllers may be located separate from the motor. Some of the one or more controllers may be located in the power storage device. Some of the one or more controllers may be located separate from the power storage device but still control the power storage device. Preferably, the one or more controllers may be located within the power storage device housing. The controller may be in direct contact with a wall of the power storage device housing, motor housing, the controller housing, or combination thereof. The controller or a printed circuit board of the controller may be attached to a wall of the power storage device housing that is in contact to the frame. The frame, power storage device housing, or a combination thereof may act as a heat sink for the controller, the printed circuit board, the power switching devices, or a combination thereof. Preferably, the frame may be a heat sink for the power switching devices.

The power switching devices may be thermally in contact with the frame through the power storage device housing. A thermal adhesive or thermal grease may be located between the wall and the controller to promote heat transfer to the wall. A thermal grease or thermal adhesive may be located between the frame and the power storage device housing, motor housing, the controller housing, or a combination thereof to promote thermal transfer to the frame. The power storage device housing, the motor housing, the controller housing, or a combination thereof may be made of aluminum and may readily transfer heat to the frame through the wall.

A wall may separate the controller and the frame. A wall may separate the controller and the motor windings. A wall may separate the controller and a power module within the power storage device. The controller may be connected to the power module even though a wall separates the controller and the power module. The controller may be located within the power storage device housing, the motor housing, the controller housing, or a combination thereof so that heat from the motor, the power storage device, or both extends around the controller and to the frame. The controller may be located so that heat from the power storage device, the motor, or both passes around the controller to the frame. The controller may extend parallel to the wall and be substantially entirely in contact with the wall. The one or more controllers may be located external of the power storage device housing, and connected to the power storage device housing, or not connected to the power storage device housing. The one or more controllers may be located within an integrated assembly (e.g., a controller housing). The integrated assembly or controller housing may be directly or indirectly connected to the power storage device housing, the frame, or both. Each controller may control one power storage device, but may be in communication with another power storage device so that each zone is coordinated with the adjacent zones (e.g., zones up stream, downstream, or both of a zone of interest). Each controller may communicate with each additional controller of a power storage device so that power being received from a first power storage device is passed through each subsequent power storage device (e.g., a first power storage device is receiving power and all other power storage devices are daisy-chained together to receive that power). Each controller may function to control a plurality of power storage devices. Preferably, each controller may control a power storage device that is associated with one or more master rollers, and the one or more master rollers may provide power to one or more slave rollers. Each controller may include a sensor or may include sensorless technology that determines when a power module of the power storage device should be activated to power the motors, the master rollers, or both. Preferably, each sensor determines activation of a power storage device connected to a master roller driving a plurality of rollers. The one or more controllers may be located within a controller housing or a power storage device housing.

The one or more controller housings may function to house the controller, contact the controller, or both. The one or more controller housings may include a pocket that houses the controller (e.g., an integral pocket). The pocket of the controller housing has a plurality of walls. The controller may be directly connected to a wall of the pocket of the controller housing. The controller, a printed circuit board of the controller, or both may be directly connected to a wall of the controller housing. The controller, the printed circuit board, or both may extend generally parallel to a wall of the pocket and be connected to the wall so that the area (length*width) faces the wall. The power switching devices of the controller may be in contact with the controller housing, the frame, a wall in contact with the frame, or a combination thereof. The conveyor system may be free of a controller housing. For example, the master roller may be the motor, thus, the motor is not located within a housing. The conveyor system may be free of a controller housing, a controller pocket, or both when the controller is located within the motor. The controller housing may be directly connected to the frame. The controller housing may be the power storage device housing. The controller housing may be located within the power storage device housing. The controller housing may have a geometric shape. The controller housing may be a rhombus. The controller housing may be a square, rectangle, a shape with chamfered corners, one or more flat walls, or a combination thereof. The controller housing may include a through hole. The motor shaft, a roller shaft, or both may extend through the controller housing. The controller housing may be "U" shaped and the motor shaft, the roller shaft, or both may extends through the controller housing. The controller housing may be in two or more pieces and the motor shaft, the roller shaft, or both may extend between the pieces of the controller housing. The controller housing may be free of contact with the motor shaft, the roller shaft, or both. The controller housing may include one or more faster holes. Preferably, the controller housing includes a plurality of fastener holes. The fastener holes may connect the controller housing to a frame, the motor housing, or both. The controller housing may have one set of fastener holes for connecting to the frame and a second set of fastener holes for connecting to the motor housing. Preferably, the fastener holes extend through the controller housing so that one set of fasteners (e.g., screws, bolts, a threaded member, rivet) extend from the frame through the controller housing and into the motor housing to connect the frame, motor housing, and controller housing all together. The controller housing may be free of separate mounting ears that extend from the controller housing to form a connection with the frame (e.g., a mounting support that extends outward from the housing). The one or more controllers may be located outside of the motor stator. The one or more controllers may be integrally part of the motor stator, motor shaft, or both.

The one or more motor stators may function to move one or more rotors. The motor stator may be located within a master roller. The motor stator may include all or a portion that is housed within a magnet, roller tube, or both. The one or more motor stators may be two or more motor stators that are spaced apart with in the rotor. For example, there may be two discrete motor stators and two discrete rotors that are connected to a roller tube so that the roller tube and the magnets are rotated. The motor stator may be located outside of a roller. The motor stator may extend around a motor rotor and a roller rotor. The motor stator may be connected to the motor shaft. The motor stator may be connected to the motor housing. The multiple motor stators are present the motor stators may be located on opposing ends of a roller tube. When multiple motor stators are present the motor stators may both be located at a same end of roller shaft. When multiple motor stators are present the motor stators may be located in a center of the roller tube. The motor rotor may include one or more magnets, one or more motor windings, or both. The motor stator may be powered to move the motor rotor by powering one or more windings of the motor stator. The one or more windings may be coiled or otherwise wrapped around the motor stator and receive power. The one or more windings may be copper, nickel, silver, silver coated copper, a conductive metal, or a combination thereof. The windings may be in the form of a continuous wire, coils, or separate wires interconnected. The motor stator may be free of contact with the magnets, the rotor, or both. The motor stator may assist in moving a motor rotor so that the motor rotates a master roller. Preferably, the motor stator in located within a center of the motor, in contact with a motor shaft, or both and the one or more magnets, roller tube, or both extend around the motor stator. The motor rotor, a plurality of magnets, or both, may extend around the motor stator.

The one or more of magnets may function to rotate the rotor when the motor windings are powered. The one or more magnets may be a solid permanent ring magnet. The one or more ring magnets may be a single ring magnet. The one or more magnets may be a plurality of magnets. The ring magnet may be a segmented ring magnet. The segments may be connected together to form a ring magnet. The plurality of magnets may extend around an outside of the motor rotor. The plurality of magnets may form a ring magnet. The motor may include an even number of magnets. The motor may include an odd number of magnets. The magnets may be made of or include a ferrous metal, neodymium, iron, boron, samarium, cobalt, rare earth metals. The one or more magnets may be formed using sintering, hot pressing, molding, or combination thereof. Preferably, the magnets may be formed by sintering or hot pressing so that the magnets are substantially pure. The one or more magnets may be formed using an adhesive. Preferably, the one or more magnets may be free of an adhesive. The one or more magnets may be coated using nickel, gold, chrome, copper, an epoxy resin, or a combination thereof. The one or more magnets may have a corrosion resistant coating. The one or more magnets may be coated with a sacrificial coating (e.g., zinc). The one or more magnets may be coated with a coating that does not affect the magnetism of the magnets. The coating may be an electroplated coating, a spray on coating, a hot dip coating, a rolled on coating, a baked on coating, or a combination thereof. The magnet may be substantially free of burrs. The one or more magnets may be connected to the motor rotor. The one or more magnets may be spaced apart. The one or more magnets may be axially connected, arc shape connected, or both by an adhesive or alignment tabs to form part of a motor rotor, the roller tube, or both. The one or more magnets may form a portion of the rotor. Preferably, the one or more magnets are connected via an adhesive and are free of alignment tabs (e.g., a male member that extends axially into a female member of another magnet so that the magnets are maintained in alignment). For example, axial ends of the magnets are substantially flat and each end is flat and planar. The ends of the magnets may be complementary to each other. The one or more magnets may be connected (e.g., arc shape connected) to form one or more ring magnets by an adhesive or connection mechanism. The connection mechanism may be a shaped portion of a mating end of a magnet. The one or more magnets when connected (e.g., arc shape connected) may have a plurality of semi-circular pieces (i.e., ring magnet segments) that when connected together form a complete circle. Each piece may have a mating end (e.g., axially or radially). For example, a first mating end of a first piece may form a complementary connection with a second mating end of a second piece, and the first mating end of the second piece may extend into a second mating end of third piece until a complete ring is formed. The mating ends may be flat. The mating ends may be contoured to connected together. One mating end may include a female feature. One mating end may include a male feature. The male features and the female features may connect together so that a ring is formed. The mating end (e.g., connection mechanism) may be v shaped, semi-circular shaped, U shaped, W shaped, M shaped, or a combination thereof. The one or more magnets may be joined together without an adhesive to form part of a motor rotor. The arc shaped pieces may be touching each other at the mating ends. The arc shape pieces may not touch each other at the mating area, but be connected to each other via spacers or molding material. The one or more magnets may have a keying mechanism or key recess and/or key to mate with a roller tube.

The roller tube may function to support and article, move an article, or both. The roller tube may encompass the motor, be a motor rotor, or both. The roller tube and roller shaft may be separated by and/or connected by two or more bearings. The roller tube may surround a portion of the roller shaft. The roller tube may be free of connection with a motor, motor stator, motor rotor, or a combination thereof. The roller tube may be the outer surface of the motor (and the master roller). The roller tube may be a motor housing. The roller tube may be connected to the roller shaft by one or more bearings. The roller tube may connect to the one or more magnets to form the motor rotor. The roller tube may include one or more key recesses, keys, or both to mate with the one or more magnets. For example, the one roller tube may have a key recess that receives a key that is integrally formed with the magnet, over vice versa. If the roller tube includes a key recess then a separate key is inserted into the key recess of the roller tube and the magnet. The separate key may be inserted into the key recess of the roller tube before the magnets are installed into the roller tube. The roller tube and one or more magnets may both have a key recess to receive a separate key that is inserted to connect the roller tube and one or more magnets. The key may be a separate key that is formed of a substantially similar material as the roller tube or a different material. The roller tube may extend axially along the length of the roller shaft and terminate substantially near the frame. Preferably, the roller tube is round (i.e., has a circular cross-section), and an interior surface of the roller tube mates with an exterior surface of the one or more magnets to form a motor rotor surrounding the motor stator. The roller tube may be connected with one or more magnets to form a motor rotor.

The motor rotor may function to move one or more rollers. The motor rotor may be connected to the motor shaft through bearings. The motor rotor may surround the motor stator, rotate about the motor stator, or both. The motor rotor may be located inside of the motor stator. The motor rotor may receive a roller shaft. The motor rotor may connect to a motor shaft. The motor rotor may directly drive a roller. The motor rotor may be connected to a gear box. The motor rotor may be free of connection with a gear box. A plurality of magnets may be spaced apart in the motor rotor. The plurality of magnets may be connect axially edge to edge (i.e., adhered together) in the motor rotor. The motor rotor may be rotated by the motor stator, the windings, or both. The motor rotor may be rotated by the magnets when the motor windings are powered. The motor rotor may include a hub that is connected to the motor shaft through bearings. The one or more motor windings may be wound around the hub.

The one or more motor windings function to rotate the rotor when the motor windings are powered. The one or more motor windings may move the magnets when the motor windings are powered. The motor may include a plurality of motor windings. The motor windings may be complementary to the magnets. The motor may include an odd number of motor windings. The motor may include 2 or more, 4 or more, 6 or more, 8 or more, 10, or more, 12 or more, 14 or more, 16 or more, 18 or more, or even 20 or more motor windings. The plurality of motor windings may be about 50 or less, 40 or less, or 30 or less motor windings. The motor windings may be located inward of the magnets (i.e., the magnets may extend around the motor windings). The motor windings may be surrounded by the one or more magnets, the roller tube, or both. The motor windings may be located within the motor housing to rotate the motor rotor resting on motor shaft by one or more bearings.

The motor housing may be the roller tube. The motor housing may function as both a housing and a rotor. The motor housing serves as the back iron the magnetic poles mounted inside to transfer the magnetic field. The motor housing may be round, square, have one or more flat walls, or a combination thereof. The motor and motor housing may be located adjacent to the rollers, the master rollers, or both. The motor housing may have an empty center (e.g., an internal pocket or a motor pocket) that receives the motor rotor, the motor stator, or both. The motor housing may include one or more internal pockets. Preferably, the motor housing includes at least a motor pocket. The motor housing may include a single pocket and the one or more motor stators and the one or more controllers may be located within the single pocket. The motor housing may be connected to the motor shaft by bearings so that the motor housing rotates about the motor shaft (i.e., the roller tube rotates about the roller shaft).

The one or more bearings may function to support the motor shaft as the motor shaft is rotated. The one or more bearings may be end caps or part of end caps of the roller tube. The one or more bearings may permit the roller tube, rotor, or both to rotate relative to the motor shaft, motor stator, roller shaft, frame, or a combination thereof. The one or more bearings may be connected to the frame. The one or more bearings may be free of contact with the frame. The one or more bearings may allow the rollers to rotate about an axis. The one or more bearings may be located within a body (e.g., roller tube) of the roller. The one or more bearings may extend between the body of the roller and the roller shaft. The one or more bearings may have a different geometry along an outer diameter and an inner diameter. For example, the one or more bearings may have a round outer diameter to mate with the roller tube, and have a hexagonal inner diameter to mate with the roller shaft. The one or more bearings may be a flange bearing. The bearing may be located within a housing that includes one or more flanges. The one or more flanges may function to connect the bearing to the frame. The one or more flanges may support the bearing on the frame but allow for some movement of the bearing relative to the frame, the flanges, or both. The one or more flanges of the flange bearing may receive one or more fasteners for connecting the bearing to the frame. The one or more bearings may be connected to the roller shaft, the motor shaft, the roller tube, or a combination thereof. The one or more bearings may be connected using a snap ring, a clamp band, a retaining ring, or a combination thereof. The one or more bearings may be prevented from moving axially by one or more snap rings, clamps, retaining rings, circlips, or a combination thereof. The one or more bearings may be flexible. The one or more bearings may be flexible so that the roller shaft may not be perpendicular to the frame on the drive side and/or the ride side. The one or more bearings may include a flexible sleeve that permits movement of the roller shaft.

The one or more flexible sleeves may function to permit movement of the bearing, the roller shaft, or both relative to each other. The one or more flexible sleeves may be a plurality of flexible sleeves. The one or more flexible sleeves may be located between the bearing and the roller shaft. The one or more flexible sleeves may be located between an outer ring of the bearing and the bearing housing. The one or more flexible sleeves may be located between the outer ring of the bearing and the body of the roller. The one or more flexible sleeves may permit the roller shaft to extend between the frames when the connection points (e.g., bearing, hole in frame, motor shaft) are not collinear. The flexible sleeve may assist when the center of the bearings and a central axis of the roller shaft are not collinear, when the center of the bearings and a central axis of the roller shaft are not concentric. The flexible sleeves may allow a center of the bearing to move without affecting the ability of the bearing to rotate. The bearing may be a spherical plain bearing. The bearing may have a ball and socket arrangement so that an inner race can move relative to an outer race. The bearing may permit angular rotation about a central axis point in one or more orthogonal directions or two or more orthogonal directions. The flexible sleeve may be made of or include metal, rubber, fiber, a natural material, a synthetic material, plastic, a polymer, poly vinyl chloride, urethane, neoprene, nylon, nitrile, polyester, leather, or a combination thereof. The one or more flexible sleeves may function to rotate in an upstream direction (e.g., in the forward direction) or a downstream direction (e.g., in the rearward direction). The one or more flexible sleeves may be used with or in lieu of a frame with adjustable portions. The one or more bearings with the flexible sleeves may be housed in one or more bearing housings.

The one or more bearing housings house the one or more bearings. The one or more bearing housings may connect the one or more bearings to the frame, a master roller, a slave roller, or a combination thereof. The one or more bearing housings may prevent debris from reaching the one or more bearings. The one or more bearing housings may be shaped substantially similar to the one or more bearing housings, or different. For example, the one or more bearing housings may have an inner diameter similar shaped substantially similar to an outer diameter of the one or more bearings (i.e., circular), and the one or more bearings may have an outer diameter shaped substantially similar to an inner diameter of a master roller (i.e., circular). The one or more bearing housings may be made from a similar material to the one or more bearings, or different.

The adjustable portions may function to permit movement of a roller shaft, the motor shaft, bearings, or a combination thereof so that the rollers may be adjusted to be substantially parallel with both side of the frame. The adjustable portions may be a through hole in the frame that permits movement of the motor shaft, the bearings, or both along the machine direction. The adjustable portions may be an oblong hole in the frame. The adjustable portions may allow the bearings to slide along the frame when the fasteners are loosened. The adjustable portions may be oval. The adjustable portions may permit movement of a roller shaft, the motor shaft, bearings, or a combination thereof in one or more zones.

Each zone includes a plurality of rollers. Each of the plurality of rollers spans between two sides of a frame and support articles as the articles are moved along the rollers. Each zone may include one or more cantilever rollers. Preferably, when a cantilever roller is present the cantilever roller is a master roller. The plurality of rollers include one or more master rollers and one or more slave rollers and the master rollers drive one or more of the slave rollers.

The one or more master rollers function to be rotated by a motor, move an article, move one or more slave rollers, or a combination thereof. The one or more master rollers may be a motor (e.g., an outside of the motor may serve to carry a load). Preferably, the master roller is a motor that rotates itself or is directly driven by a motor. The one or more master rollers may be an internal motor that includes substantially all of the motor components integrated with the master roller. Preferably, the one or more master rollers are a motor. The one or more master rollers may be connected to a power storage device to move the one or more master rollers. The one or more master rollers may be powered by one or more power storage devices. A plurality of power storage devices may be connected to each master roller to generate sufficient power to move the master roller. Preferably, a single power storage device is connected to each master roller to provide sufficient power to move the master roller. The one or more master rollers may be located in a plane (e.g., a second plane) above or below the motor, the slave rollers, or both. Preferably, the master rollers are located in a same plane as the slave rollers, other master rollers, or both. The one or more master rollers may be a partial roller (e.g., a pulley) when the master rollers are located in a plane below the slave rollers. The pulley may not directly support articles. The master roller may include a roller shaft that is entirely or partially hollow. The master roller may contact a first side of the frame and a second side of the frame to support the master roller within the conveyor system. The master roller may extend cantilever form the frame. The motor shaft may be located at a first end and a second end and may be terminal so that the motor shaft does not extend through a body of the roller. The one or more master rollers may be located at an end of the conveyor system, in a middle of the conveyor system, or both. The one or more master rollers may be located between one or more slave rollers. The one or more master rollers may include a plurality of slave rollers on each side (e.g., upstream and downstream). The one or more master rollers may be substantially the same size as the slave rollers. The master rollers may be larger than the slave rollers. The one or more master rollers may be smaller than the one or more slave rollers. The one or more master rollers may be connected to one or more slave rollers via one or more transfer devices. The one or more master rollers may directly drive each slave roller via one or more transfer devices. The one or more master rollers may directly drive some slave rollers and indirectly drive some slave rollers via one or more transfer devices. For example, some slave rollers may drive other slave rollers by transfer devices extending between two or more slave rollers.

The one or more slave rollers may function to support one or more articles, one or more transfer devices, or both. The one or more slave rollers may assist in moving one or more articles. The one or more slave rollers may surround the master rollers. The one or more slave rollers may be substantially identical to the master rollers. The one or more slave rollers may extend parallel to the master rollers. Each slave roller is suspended between two pieces of the frame (e.g., a first frame piece and a second frame piece that are parallel to each other). Each zone may include at least one master roller and a plurality of slave rollers. The slave rollers may be connected to the frame at one or both ends.

The one or more frames function to support the plurality of rollers or the supports so that articles can move along the conveyor system. The frame may be one or more pieces that support one or more ends of the rollers, a motor, a controller, or a combination thereof. The one or more frames may be "L" shaped, "C" shaped, "U" shaped, "I shaped," or a combination thereof. Preferably, the one or more frames may be two parallel pieces. The one or more frames may be supported by one or more supports. The one or more frames may be connected by one or more stabilizer bars to prevent tipping of the one or more frames. The one or more frames may be a rigid structure for stationary applications. The one or more frames may be expandable, collapsible, or both for dynamic movement between a first location and a second location, a fluctuating distance for moving an article, storage, or a combination thereof. For example, the one or more frames may be expanded to accommodate a larger distance of travel to move an article, and the one or more frames may be collapsible and compressed to a substantially smaller size for movement when not being used. The one or more frames may be expandable and collapsible using an accordion frame, one or more biases, hinges, telescoping segments, or a combination thereof. The one or more frames may include a plurality of frame segments that fold or disconnect to be stored or transported. Preferably, the one or more frames have a plurality of accordion style pivot points to compress the one or more frames as single pieces. The one or more frames may connect two or more zones together or extend between two or more zones. The one or more frames may be connected to one or more bearings that support one or more ends of the rollers. The one or more frames may be directly connected to the one or more rollers and the roller shafts may be static relative to the frame and a roller housing may be movable relative to the roller shaft. The one or more power storage devices may be directly connected to the frame. The one or more power storage devices may hang from the frame or extend between opposing portions of the frame. The one or more power storage devices may be mounted to one or more power storage device supports connected to the frame by one or more support arms. The one or more motors may be directly connected to the frame. The motors may hang from the frame or extend between opposing portions of the frame. The controller housing may be connected to the frame and the motor housing may hang from the frame. The one or more frames may be made of metal, plastic, a rigid material, steel, a coated metal, aluminum, or a combination thereof and may support the rollers and articles that move along the frame. The one or more frames may be supported and raised from a surface using one or more supports.

The one or more supports function to raise the one or more frames and stabilize the one or more frames when being powered. The one or more supports may be connected to the frame using welding, fasteners, press-fittings, adhesives, threading, hinges, rivets, snap-fittings, or a combination thereof. The one or more supports may be adjustable in height. For example, the one or more supports may be telescoping or include adjustable feet to adjust the height of the one or more supports. The one or more supports may be fastened to a platform or the ground using fasteners, adhesives, threading, rivets, snap-fittings, or a combination thereof. The one or more supports may be collapsible (e.g., a hinge to fold the support onto the frame). The one or more supports may be removably attached to the frame. The one or more supports may be integrally formed with the frame. The one or more supports may be made of a similar material as the frame (e.g., both are aluminum), or different materials. The one or more supports may be substantially straight, curved, L-shaped, V-shaped, H-shaped, or a combination thereof. The one or more motors may be secured to the one or more supports. The one or more stabilizer bars may be interconnected between the one or more supports to prevent tipping of movement of the one or more frames. For example, the one or more stabilizer bars connect a support from a first frame and a support from a second frame to create a conveyor system frame. One or more wheels may be attached to the one or more supports for mobility of the one or more frames. The one or more power storage devices may be attached to the one or more supports. Preferably, the one or more supports include a power storage device support that is mounted to the one or more supports, and supports the one or more power storage devices.

The one or more power storage device supports function to secure the one or more power storage devices to the one or more frames, one or more supports, one or more stabilizer bars, or a combination thereof. The power storage device support may be a platform that is secured to one or more frames, one or more supports, one or more stabilizer bars, or a combination thereof. The one or more power storage device supports may be hook or clamp that secures the power storage device. The power storage device supports may secure the power storage device in a position substantially parallel the slave rollers, the master rollers, the motor, or a combination thereof. The power storage device supports may secure the power storage device in a position substantially perpendicular to the slave rollers, the master rollers, the motor, or a combination thereof. The one or more power storage device supports may connect to one or more supports, one or more stabilizer bars, one or more frames, one or more motors, one or more rollers, or a combination thereof using welding, fasteners, adhesives, threading, rivets, snap-fittings, or a combination thereof. The one or more power storage device supports may be shaped substantially similar to a footprint of a power storage device or shaped substantially different. The one or more power storage device supports may be cantilevered to one or more frames, one or more supports, one or more stabilizer bars, or a combination thereof. The one or more power storage device supports may be free to pivot, rotate, collapse, extend or a combination thereof. The one or more power storage device supports may be prevented from rotation using one or more support arms.

The one or more support arms function to prevent rotation of the power storage device support. The one or more support arms function to further connect the one or more power storage device supports to one or more supports, one or more frames, one or more stabilizer bars, or a combination thereof. The one or more support arms may be connecting to the one or more power storage device supports, one or more frames, one or more stabilizer bars, or a combination thereof using welding fasteners, adhesives, threading, rivets, snap-fittings, or a combination thereof. The one or more support arms may increase rigidity of the one or more power storage device supports when a power storage device is powering a conveyor system so that the rollers rotate as the motor and transfer devices provide power between the plurality of rollers.

The transfer devices may function to provide power from a master roller to one or more slave rollers, from a slave roller to one or more adjacent slave rollers, or both. The one or more transfer devices may connect a motor, a master roller, or both to one or more slave rollers. Preferably, the transfer devices only connects rollers to rollers. For example, the transfer devices may connect a master roller to a slave roller or the transfer device may connect two or more slave rollers together. The transfer devices may extend around one or more support devices. The one or more support devices may be a roller, a support that does not move and is free of connection to a transfer device, or both. The transfer devices may extend around both rollers and supports. For example, ends of a conveyor system may be rollers and between the rollers may be a plurality of supports. The transfer devices may be a belt. The transfer devices may be an "O" belt, "O" ring belt, "V" belt, "V" ring belt, poly-V belt, or a combination thereof. The transfer devices may be on continuous piece. The transfer devices may be a plurality of pieces that are connected together. The transfer devices may include one or more grooves and preferably a plurality of grooves. The grooves may have a "V" shape. The grooves may have a complementary fit to grooves in the over roller cartridge. The transfer devices may include one or more spikes or teeth that extend from the transfer device. The transfer devices may be made of or include metal, rubber, fiber, a reinforcement, a natural material, a synthetic material, plastic, a polymer, poly vinyl chloride, urethane, neoprene, nylon, nitrile, polyester, leather, or a combination thereof. The transfer devices may be a chain, a reinforcement coated by rubber, a gear, a toothed member, a belt, or a combination thereof. The one or more transfer devices may be a conveyor belt. The one or more conveyor belts function to carry an article above a plurality of rollers. The one or more conveyor belts may be supported on the one or more rollers. The conveyor belts may be driven by one or more master rollers. The conveyor belt may be driven by friction between the conveyor belt and the master roller. The conveyor belts may receive the plurality or rollers so that the plurality of rollers are substantially covered by the conveyor belt. The conveyor belt may extend between two sides of the frame. The conveyor belt may be driven by a master roller. The conveyor belt may be one solid piece that is connected together forming an endless conveyor belt. The conveyor belt may be made of rubber, poly vinyl chloride, urethane, neoprene, nylon, nitrile, polyester, leather or a combination thereof. The conveyor belt may extend over a body of the rollers and move independently of the roller shafts. The transfer device may be one or more flexible couplings.

The one or more flexible couplings may function to connect two or more rollers together in a roller conveyor. The flexible couplings may extend over a roller in an end region of the roller. The one or more flexible couplings may sit within a recess in the rollers. The one or more flexible couplings may be located at one end or both ends in an end region. The one or more flexible couplings may be a single piece. The one or more flexible couplings may be a chain with a plurality of links. The one or more chains may be made of steel, stainless steel, brass, nickel, aluminum, titanium, carbon fiber, polymers, or a combination thereof. The one or more flexible couplings may be a polymer or rubber that is an endless piece. The flexible couplings may be a gear that extends from one roller to an adjacent roller to provide power form one roller to another roller. The flexible couplings may be used with a conveyor belt, but preferably when a conveyor belt is used the flexible couplings are not used. The one or more flexible couplings may rotate with the one or more roller shafts.

The one or more roller shafts function to connect the rollers to a frame, a motor, or both. The one or more roller shafts may function to connect a roller shaped motor within a frame. The one or more roller shafts may be fixedly connected to the frame. The one or more roller shafts may function to be move relative to the frame. The roller shaft may be a motor shaft. The roller shaft may function as both the roller shaft and the shaft that extends through the one or more stators. The motor may be mounted to the one or more roller shafts in the shape of the master roller. The one or more roller shafts may be connected to one or more bearings. The one or more roller shafts may be connected to a frame by one or more bearings. Preferably, the motor shaft is directly connected to the frame and all or portion of the roller rotates around the roller shaft. The one or more roller shafts may be connected to the body of the roller by one or more bearings. The one or more roller shafts may move with the roller body (i.e., a fixed roller shaft). The one or more roller shafts may move independent of the body of the roller (i.e., a movable roller shaft). The one or more roller shafts may extend cantilever from a body of a roller. The one or more roller shafts may support the roller on the frame. The one or more roller shafts may be solid, hollow, have a smooth exterior, or a combination thereof. One or more wires may extend into the motor (or master roller) through the roller shaft. The one or more roller shafts may be hollow and air may flow through the roller shaft to cool the motor. The one or more roller shafts may have a cross-sectional shape that is circular, triangle, square, oval, pentagon, hexagon, octagon, heptagon, decagon, nonagon, or a combination thereof. The one or more roller shafts may function to allow the roller to rotate. The one or more roller shafts may function to carry a load, apply a load to a frame, or a combination thereof. The one or more roller shafts may extend into a bearing, a motor, or both. The one or more roller shafts may be fixed relative to the frame. The one or more roller shafts may have a smooth exterior. The one or more roller shafts may include one or more grooves and may be connected to one or more shaft covers.

The one or more shaft covers connect to a distal end, a proximal end, or both of a roller. The one or more shaft covers receive an end of a roller and connect the roller to a bearing, a controller housing, a frame, or a combination thereof. The roller shaft may be pressed into a shaft cover.

The one or more shaft covers may be connected to the shaft using an adhesive, fasteners, welding, interlocking (i.e., a male portion and a female portion), or a combination thereof. The one or more shaft covers may be shaped substantially similar to the roller shaft, or different. For example, the one or more shaft covers may receive a round roller shaft, thereafter connecting the roller shaft to one or more bearings using a hexagonal shaft of the one or more shaft covers. The one or more shaft covers may be made from a similar material to that of the roller shaft, or different.

The one or more grooves may receive one or more transfer devices. The one or more grooves may be located in the roller tube, in the roller shaft, or both. The roller tube may include one or more grooves. The roller tube may include grooves, over roller cartridges, or both. The one or more grooves may receive one or more bushings. The one or more grooves may be sufficiently deep so that the one or more transfer devices, bushings, or both are flush with a body when the transfer devices are located within the grooves. The one or more grooves may assist the transfer devices in rotating the rollers. The one more grooves may be located in an end region of the motor shaft, the roller shaft, or both. The one or more grooves may transfer a force from the master roller (i.e., motor) to one or more slave rollers. The one or more motors may function to move one or more master rollers.

The over roller cartridge may receive one or more transfer devices. The over roller cartridge may receive a V-belt, O-belt, chain, or a combination thereof. The over roller cartridge is connected to an exterior surface of a roller tube. The over roller cartridge may be connected to a master roller, a slave roller, or a combination thereof. The over roller cartridge may receive the one or more transfer devices from an over roller cartridge of another roller. The over roller tube may receive the one or more transfer devices from one or more grooves of another roller. The over roller cartridge may be connected near a terminal end of the roller. The over roller cartridge may be connected near a center of the roller. The over roller cartridge may be press fit, adhered, fastened, welded, interlocked (i.e., a male and female connection) with the roller tube. The over roller cartridge may be removable. The over roller cartridge may have a shape substantially similar to the transfer device being received. For example, the over roller cartridge may have one or more hooks to receive a chain, or have a V-shaped groove to receive a V-belt. The over roller cartridge may be made from a substantially similar material to the roller tube, or a different material. The over roller cartridge may vary in width to accommodate different width transfer devices. The over roller cartridge may transfer a force from the master roller (i.e., motor) powered by one or more power storage devices to one or more slave rollers.

The one or more power storage devices function to power a motor, a controller, or both. The one or more power storage devices connect to an external power source (i.e., a wall outlet) and further connect to one or more motors. The one or more power storage devices power one or more motors, one or more controllers, or both free of an external power source (i.e., a source other than the power storage devices (e.g., using a self-contained power module)). The one or more power storage devices may include a power supply (i.e., a power source integrated into the power storage device (e.g., using a power source other than the external power source). Preferably, the power supply is one or more power modules located within the one or more power storage devices. A single power storage device may power a plurality of motors, a plurality of controllers, or both. The one or more power storage devices may be housed in a power storage device housing. The one or more power storage devices may include one or more power storage modules in addition to electronics such as a microprocessor, a printed circuit board (PCB), switches, capacitors, resistors, inverters, convertors, memory, sensors, or a combination thereof. The one or more power storage devices may include one or more power modules that power one or more motors. The one or more power storage devices may include one or more power storage device inputs to receive power from an external source (i.e., a wall outlet). The one or more power storage devices may include one or more power storage device outputs to connect to one or more motors, one or more master rollers, one or more controllers, one or more additional power storage devices, or a combination thereof. The one or more power storage devices may scrub incoming power before distributing power to the one or more motors, the one or more controllers, or both. For example, the one or more power storage devices may receive fluctuating power unfit to be received by the one or more motors, one or more controllers, or both. The one or more power storage devices may cleanse the fluctuation power and distribute proper (i.e., clean) power to the one or more motors, one or more controllers, or both, so that the one or more motors, the one or more controllers, or both can be powered properly. Each of the one or more power storage devices may have one or more power storage device outputs, one or more power storage device inputs, or both. Each of the one or more power storage devices may be receiving power from an external power source (i.e., a wall outlet) independently. Each of the one or more power storage devices may be receiving power dependently from a single external power source (i.e., a wall outlet). For example, the one or more power storage devices may be daisy-chained together (i.e., each power storage device is connected to another power storage device) and only a single power storage device includes a power storage device output that is connected to an external power source, powering all of the power storage devices. The one or more power storage devices may be adapted to take high power loads during use. For example, the one or more power storage devices may maintain power without damage during movement of heavy articles through a conveyor system. The one or more power storage devices may supply a constant voltage output to the one or more motors, the one or more controllers, or both. The one or more power storage devices may supply a voltage that is greater than a voltage above a minimum required voltage. The one or more power storage devices may supply a constant current output to the one or more motors, the one or more controllers, or both. For example, the one or more power storage devices may fluctuate a resistance in the one or more power storage devices to maintain a constant current being outputted to the one or more motors, the one or more controllers, or both. The one or more power storage devices may include one or more switches with one or more controllers to switch between a constant voltage or a constant current output. The one or more power storage devices may be housed in the motor housing or controller housing. Preferably, the one or more power storage devices are housed in power storage device housings.

The power storage device housing functions to house one or more power storage devices. The power storage device housing may include one or more compartments for one or more different components. For example, a first compartment may house the one or more power modules, one or more batteries, while a second compartment may house one or more controllers, one or more converters, one or more inverters, or a combination thereof. The one or more compartments may be separated by a wall so that components do not contact one another. The power storage device housing may be rigid or may be flexible. The power storage device housing may be made from aluminum, steel, tin, iron, copper, or a combination thereof. Preferably, the power storage device housing may be made from polyethylene terephthalate, polymers, polypropylene, carbonized plastic, or other plastics. The power storage device housing may be stamped, injection molded, cast, extruded, or a combination thereof. The power storage device housing may comprise one or more layers. For example, the power storage device housing may include a polyethylene terephthalate layer, a polymer layer, a polypropylene layer, a carbonized plastic layer, a metal layer, or a combination thereof. The power storage device housing may include a single layer. The power storage device housing may include a plurality of layers in one section while a second section has a single layer. For example, the power storage device housing may have a plurality of layers surrounding the one or more power modules and have a single housing layer encasing the one or more controllers. The power storage device housing may include the one or more power storage device outputs, the one or more power storage device inputs, or both. The power storage device housing may include one or more positive terminals, one or more negative terminals, or both. The power storage device housing may be hermetically sealed to stop moisture from penetrating the power storage device, to stop chemicals from excreting from the power storage device, or both. To be hermetically sealed, the power storage device housing may include a seal along joints of the power storage device housing. The power storage device housing may be a single integrally formed piece, or a plurality of individual pieces assembled together to create the power storage device housing. The power storage device pieces may be secured together using adhesives, fasteners, welding, rivets, mechanical locks (i.e., snap fit or press fit), or a combination thereof. One or more controllers may be secured to a wall of the power storage device housing for heat staking. The one or more controllers may be connected to one or more power modules inside the power storage device housing.

The one or more power modules function to power one or more motors, one or more rollers, or both. The one or more power modules function to power one or more motors, one or more rollers, or both free of an external power source (i.e., a wall outlet). The one or more power modules may be rechargeable. The one or more power modules may be rechargeable from single-phase power or 3-phase power. The one or more power modules may hold a charge for a period of time to power the one or more motors, one or more rollers, or both. The one or more power modules may supply power (e.g., run a motor, a controller, or both) for 5 minutes or greater, 10 minutes or greater, 15 minutes or greater, 20 minutes or greater, 25 minutes or greater, 30 minutes or greater, preferably 45 minutes or greater, or even more preferably 60 minutes or greater. For example, the one or more power modules may continue to power a conveyor system after an external power source has been shut off (i.e., a power failure in a manufacturing plant (e.g., an uninterruptable power supply)). The one or more power modules may supply power for a week or less, 3 days or less, or 1 day or less before requiring recharging. The one or more power modules may power a conveyor system that is movable. For example, a conveyor system may include a movable frame to move the conveyor system to a location without an external power source, such as outdoors. The one or more power modules may be a battery or a capacitor. The one or more power modules may be a nickel cadmium battery, a nickel-metal hydride battery, a lead acid battery, a lithium ion battery, a lithium ion polymer battery, or a combination thereof. The one or more power modules may be free of a battery. For example, the one or more power modules may be photovoltaic, geothermal, a supercapacitor, electrolyzers with fuel cells (i.e., hydrogen storage), or a combination thereof. Preferably, the one or more power modules are a rechargeable battery. The rechargeable batteries may work in conjunction with one or more additional power modules. For example one or more power modules may be a rechargeable battery and be connected to one or more supercapacitors, photovoltaic modules, electrolyzers with fuel cells, or a combination thereof. The one or more power modules may be similar or different. For example, a first power module may be a lithium ion battery and a second power module may be a supercapacitor. The one or more power modules may be removably attached. The one or more power modules may be replaceable. For example, when a power module no longer holds a charge, the power storage device housing may be opened and a user can disconnected the defective power module and connect a new power module. The one or more power modules may be secured to an internal wall of the power storage device housing using an adhesive, fasteners, rivets, welding, mechanical locks, or a combination thereof. The one or more power modules may be utilized based on a determination by one or more controllers in the power storage device. For example, the one or more controllers may monitor power being received by an external power source (i.e., a wall outlet).

The converter functions to convert a current from a power module, an external power source, or both from alternating current (AC) to direct current (DC) or vice versa. The converter converts the current to direct current to power one or more DC motors. The converter may be housed in the power storage device housing, or may be separate. For example, the converter may be connected to the power storage device by wires, and is also connected to one or more motors, one or more rollers, or both by additional wires. A single converter may convert energy for a plurality of power storage devices. Preferably, each power storage device has a separate converter. The converter may be secured to a wall of the power storage device housing by an adhesive, fasteners, welding, rivets, mechanical locks, or a combination thereof. The converter may be removably attached. The converter may be connected to the one or more power modules, one or more controllers, an external power source via the power storage device input, or a combination thereof. The converter may be separate from the one or more controllers and one or more power modules, or may be integrated into the one or more controllers, one or more power modules, or both. The converter may also act as an inverter (i.e., invert a current from DC to AC). The converter may directly supply power to the motor, the controller, or both. The converter may receive power from an external power source (i.e., a wall outlet) or one or more power modules.

The motor control electronic circuitry functions to communicate with the one or more motors based on power input received from an external power source (i.e., a wall outlet). The motor control electronic circuitry functions to communicate to the one or more motors when to power on (i.e., begin rotating the motor rotor), when to stop, fluctuations in speed or power received, or a combination thereof. The motor control electronic circuitry may receive an input power from the one or more controllers, the one or more power modules, directly from an external power source, or a combination thereof. The motor control electronic circuitry may communicate free of connection to the one or more controllers, one or more power modules, or both. The motor control electronic circuitry may monitor power output distributed to the one or more motors. The motor control electronic circuitry may monitor power usage of the one or more motors. For example, the motor control electronic circuitry may monitor if the output of the one or more motors is greater than a designated range, thereby stopping the motor before overheating. The motor control electronic circuitry may diagnose the performance of the motor. For example, the motor control electronic circuitry may monitor if the one or more motors are not functioning to a desired set of parameters. The motor control electronic circuitry may include memory, microprocessors, a printed circuit board (PCB), transistors, resistors, switches, microcontrollers, capacitors, sensors, or a combination thereof. The motor control electronic circuitry may be mounted in the power storage device, the one or more motors, the one or more frame members, or a combination thereof. The motor control electronic circuitry may be mounted to an inside wall of the one or more power storage device housings, the one or more motor housings, or both. The conveyor system may include a master motor control electronic circuitry and slave motor control electronic circuitry. For example, an independent master motor control electronic circuitry may communicate with one or more slave motor control electronic circuitry located in each of a plurality of power storage devices. The motor control electronic circuitry may be heat staked to a wall of a housing with one or more fasteners, adhesive, or both. The motor control electronic circuitry may communicate with a power storage device output to power the one or more motors.

The power storage device output functions to distribute power to one or more motors, one or more rollers, or both through wires connected between the power storage device output and the one or more motors, one or more rollers, or both. The power storage device output may be secured to the power storage device housing to connect to an internal component of the power storage device (i.e., the converter) and an external component (i.e., one or more motors). The power storage device output may include a positive terminal, a negative terminal, or both. The terminals function to connect the power storage device to one or more motors, one or more controllers, or both. The terminals may include a grommet, fastener, connector, lug, clip, hook, tongue-crimp, or a combination thereof. The terminals may include a cap or cover when not connected to a motor or roller. The power storage device output may have a nominal output voltage of about 2 volts or more, about 4 volts or more, or more preferably about 6 volts or more. The power storage device output may have a nominal output voltage of about 800 volts or less, about 600 volts or less, about 500 volts or less, or more preferably about 480 volts or less. Most preferably, the power storage device output may have a nominal output voltage of about 12 volts, about 24 volts, about 48 volts, or a combination thereof. A power storage device may have a plurality of power storage device outputs to power a plurality of motors, rollers, or both receiving power from a power storage device input.

The power storage device input connects the power storage device to an external power source (i.e., a wall outlet). The power storage device receives power to charge a power module, direct current to a converter that then directs current to one or more motors, one or more master rollers, or a combination thereof, or both. The power storage device input may include a plug to connect to an outlet of an external power source. The plug may be a 2-pin plug, a 3-pin plug, a Type A plug, a Type B plug, a Type C plug, a Type D plug, or any plug that is received by an outlet. The plug may be grounded or ungrounded. The power storage device input may be connected to the power storage device by wires. The power storage device input may be free of wires. The power storage device input and connected wires may be retractable inside the power storage device housing. For example, the power storage device may have a pocket to store the power storage device input and connected wires, or may include a retraction mechanism to retract the chord and power storage device input when not extended. The power storage device input may receive power from an external power source and direct the power to one or more power modules, one or more controllers, a converter, or a combination thereof. The power storage device input may receive power from an external power source so that the power storage device powers one or more motors, one or more rollers, or both. The power storage device input may connect to an external power source directly or may connect to a charging station connected to the external power source.

The charging station functions to receive power from an external power source and send power to the one or more power modules, one or more controllers, motor control electronic circuitry, charging system circuitry, or a combination thereof. The charging station may regulate power received from an external power source before sending power to the power storage device. The charging station may be mounted to, and connected with, an external power source (i.e., mounted to a wall and plugged into a wall outlet). The charging station may be connected to an external power source, a power storage device, one or more motors, one or more controllers, or a combination thereof. The charging station may be located inside the power storage device housing. The charging station may communicate with one or more power modules. The charging station may power the one or more motors indirectly through the one or more power modules. The charging station may be attached to the one or more frame members, one or more supports, one or more stabilizer bars, one or more power storage device supports, or a combination thereof. The charging station may be housed in a separate housing (i.e., a charging station housing). The charging station may be connected to a power storage device, an external power source, or both through wires. The charging station may regulate the power reaching the one or more power modules through charging system circuitry.

The charging system circuitry functions to monitor the one or more power modules. The charging system circuitry functions to regulate the power reaching the one or more power modules from an external power source. The charging system circuitry may communicate with the one or more power modules when to charge, when to power the one or more motors (i.e., expel power to the one or more motors), or both. The charging system circuitry may receive an input power from the one or more controllers, directly from an external power source, or both. The charging system circuitry may monitor metrics of the one or more power modules. The charging system circuitry may monitor charge capacity (i.e., a percentage charged), charge status (i.e., charging or not charging), power module life (i.e., determine if a power module needs to be replaced), power module output, power module input, or a combination thereof. The charging system circuitry may power the one or more motors indirectly through the one or more power modules. The charging system circuitry may be connected to a screen of the charging station the visually illustrates to a user the one or more power module statuses, warnings, or both. The charging system circuitry may be located in the charging station or separately. The charging system circuitry may be located in the power storage device, the one or more motors, or both. The charging system circuitry may include memory, microprocessors, a printed circuit board (PCB), transistors, resistors, switches, microcontrollers, capacitors, sensors, or a combination thereof. The motor control electronic circuitry may be mounted in the power storage device, the one or more motors, the one or more frame members, or a combination thereof. The charging system circuitry may be mounted to an inside wall of the one or more power storage device housings, the one or more motor housings, a charging station housing, or a combination thereof. The conveyor system may include a master charging station circuitry and slave charging station circuitry. For example, an independent master charging station circuitry may communicate with one or more slave charging station circuitry located in each of a plurality of power storage devices. The charging station circuitry may be heat staked to a wall of a housing with one or more fasteners, adhesive, or both.

The one or more motors may directly drive the one or more master rollers. The one or more motors may be sufficiently large to drive the master roller and one or more slave rollers, preferably four or more slave rollers, more preferably six or more slave rollers, even more preferably eight or more slave rollers, and most preferably ten or more slave rollers. The one or more motors may be powered by a power storage device or an external source (i.e., a wall outlet). The one or more motors may be formed so that the one or more motors are a master roller. The motor may run from alternating current source. The motor may run from direct current (DC) source. The one or more motors may be free of a DC power source that powers the one or more motors (i.e., battery powered). Preferably, the one or more motors run from a power storage device. The motor may be a brushless motor. Preferably, the motor is a direct current brushless motor (e.g., brushless DC motor). The motor may include a motor shaft, shaft cover, bushing, motor cover, wires, controller, motor stator, magnets, motor rotor, motor hub, motor windings, or a combination thereof. The motor may be free of contact with a gear box. For example, the motor may be the master roller so that intervening gear boxes are not needed to rotate all or a portion of the master roller. The frame may dissipate heat generated by the motor. The motor may be in direct contact with the frame and the frame may be a heat sink for the motor (e.g., the motor shafts may be connected to the frame and the frame).

The motor cover may cover one or both sides of the motor. The motor cover may function to cover the motor, a controller, or both. The motor cover may seal the motor. The motor cover may seal the motor housing. The motor cover may be part of the motor housing. The motor cover may connect to the motor housing, a frame, or both. The motor cover may receive one or more wires so that the motor, the controller, or both are powered, receive signals, or both.

The one or more wires function to provide power, signal, or both to and/or from the controller, the motor, the power storage device, or a combination thereof. The wires may connect the motor, the controller, or both to a power supply such as a power storage device. The wires may connect the motor, the controller, the power storage device, or a combination thereof to one or more sensors. The wires may connect the motor and that controller. The wires may connect the one or more power modules, converter, power storage device input, power storage device output, or a combination thereof. The one or more wires may have a sufficient gauge to carry power, signals, or both to the motor, the controller, or both, or between the controller and the motor. The wires may run through the hollow motor shaft, roller shaft, or both. The motor is connected to at least 2 wires (a positive and a negative). The motor may be connected to a signal wire. The controller may be connected to 2 or more wires or three or more wires. For example, the controller may be connected to a positive, a negative, and a signal wire. The one or more wires may directly power the controller, the motor, the power storage device, or a combination thereof. Preferably, the wires are connected to the controller and extend from the controller to the motor.

FIG. 1 illustrates a movable conveyor system 2 including a plurality of rollers 8 located between two frame members 14. The rollers 8 include a master roller 10 that is connected to slave rollers 12, which are driven by the master rollers 10. A motor 30 including a gearbox 39 is connected to one of the frame members 14 and the master roller 10 to rotate the master roller 10 and subsequently the slave rollers 12 via transfer devices 16. The conveyor system 2 includes a plurality of zones 4 (only one zone 4 is shown) with a master roller 10 in the center of each zone 4 so that slave rollers 12 are located on each side of the master rollers 10. The master rollers 10 move the slave rollers 12 in a direction 80 via one or more transfer devices 16. The frame members 14 are expandable and contractible so that rollers 8 can be moved relative to each other and length of the conveyor can be varied. The frame members 14 include a plurality of supports 26 that are on wheels 28 to expand and contract the frame members 14. The plurality of supports 26 are interconnected by a plurality of stabilizer bars 78 to prevent tipping of the conveyor system 2 during expansion and contraction of the frame members 14. A power storage device support 76 is connected to one of the supports 26 by a plurality of support arms 77. A power storage device 70 is located on the power storage device support 76. The power storage device 70 is a rechargeable battery 70A and includes a charging station 69 with charging system circuitry (not shown) to charge the rechargeable battery 70A. The rechargeable battery 70A includes a power storage device output 74 with a positive terminal 74A and a negative terminal 74B that powers the motor 30 through wires 40 that are output wires 40B connected between the power storage device output 74 and the motor 30. The rechargeable battery 70A also includes wires 40 that are input wires 40A and a power storage device input 72 for recharging the rechargeable battery 70A. The power storage device input 72 is shown in a connected state 90 (connected to a power source), and a disconnected state 92 (e.g., an uninterrupted power supply state). The rechargeable battery 70A powers the motor 30 in both the connected state 90 and disconnected state 92.

Figure 2:
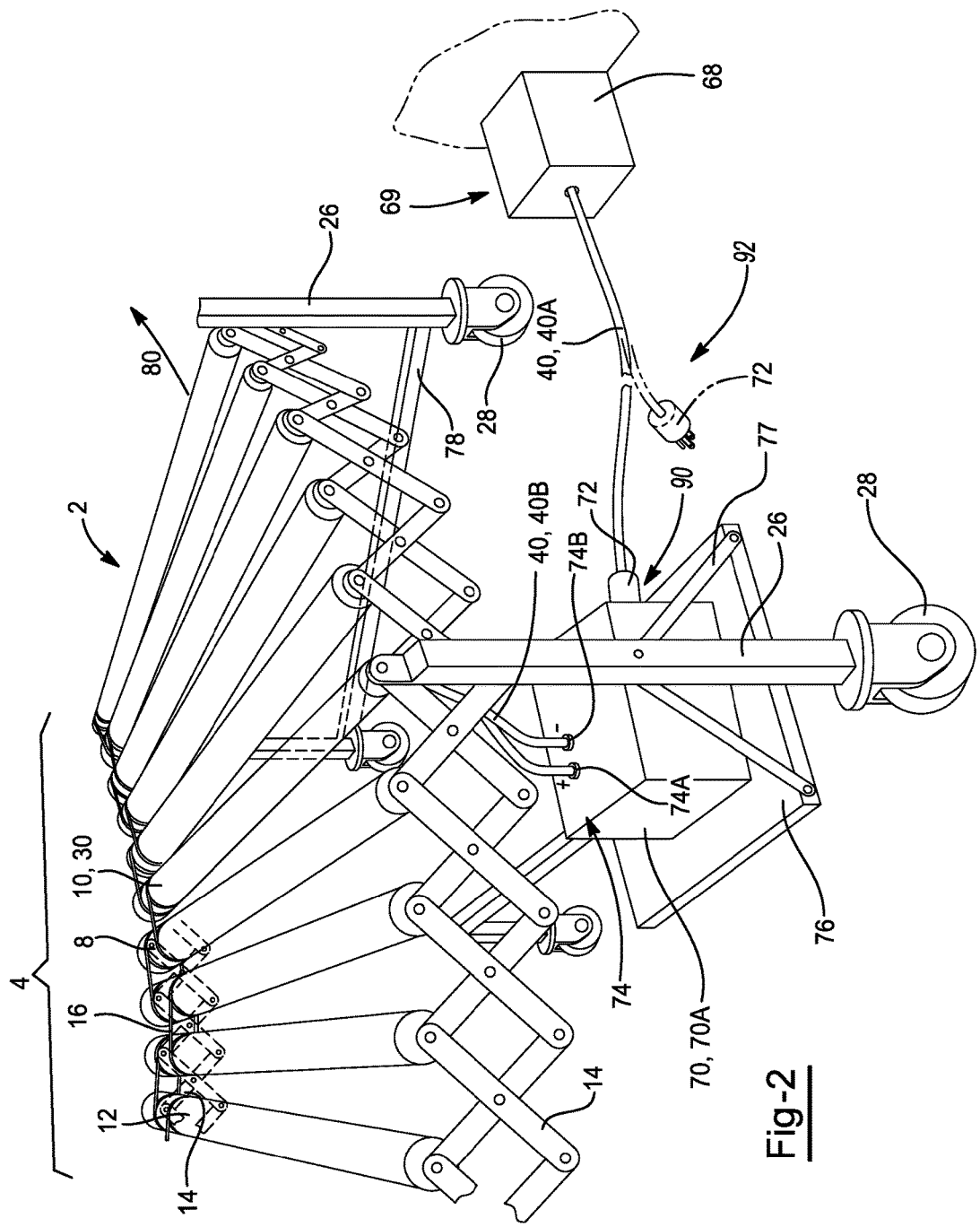
FIG. 2 is a perspective view of a movable conveyor system including a power storage device and a motor in a shape of a roller.

FIG. 2 illustrates a movable conveyor system 2 including a plurality of rollers 8 located between two frame members 14. The rollers 8 include a master roller 10 that is connected to a plurality of slave rollers 12, which are driven by the master rollers 10. The master roller 10 is a motor 30 that is shaped as a roller. The motor 30 is connected between the frame members 14 to rotate the master roller 10 and subsequently the slave rollers 12 via transfer devices 16. The conveyor system 2 includes a plurality of zones 4 (a single zone is shown) with a master roller 10 in the center of each zone 4 so that slave rollers 12 are located on each side of the master rollers 10. The master rollers 10 move the slave rollers 12 in the direction 80 via the one or more transfer devices 16. The frame members 14 are expandable and contractible so that rollers 8 can be moved relative to each other and the conveyor system 2 may be lengthened and shortened. The frame members 14 include a plurality of supports 26 that are on wheels 28 to expand and contract the frame members 14. The plurality of supports 26 are interconnected by a plurality of stabilizer bars 78 to prevent tipping of the conveyor system 2 during expansion and contraction of the frame members 14. A power storage device support 76 is connected to one of the supports 26 by a plurality of support arms 77. A power storage device 70 is located on the power storage device support 76. The power storage device 70 is a rechargeable battery 70A. The rechargeable battery 70A includes a power storage device output 74 with a positive terminal 74A and a negative terminal 74B that powers the motor 30 through wires 40 that are output wires 40B connected between the power storage device output 74 and the motor 30. The rechargeable battery 70A also includes wires 40 that are input wires 40A and a power storage device input 72 for recharging the rechargeable battery 70A so that the rechargeable battery 70A can power the motor 30. The power storage device input 72 is connected to a charging station 69 that includes charging circuitry 68 by the input wires 40A. The power storage device input 72 extends from the charging station and connects to the rechargeable battery 70A. The power storage device input 72 is shown in a connected state 90 (connected to a power source), and a disconnected state 92 (e.g., an uninterrupted power supply state). The rechargeable battery 70A powers the motor 30 in both the connected state 90 and disconnected state 92.

Figure 3:
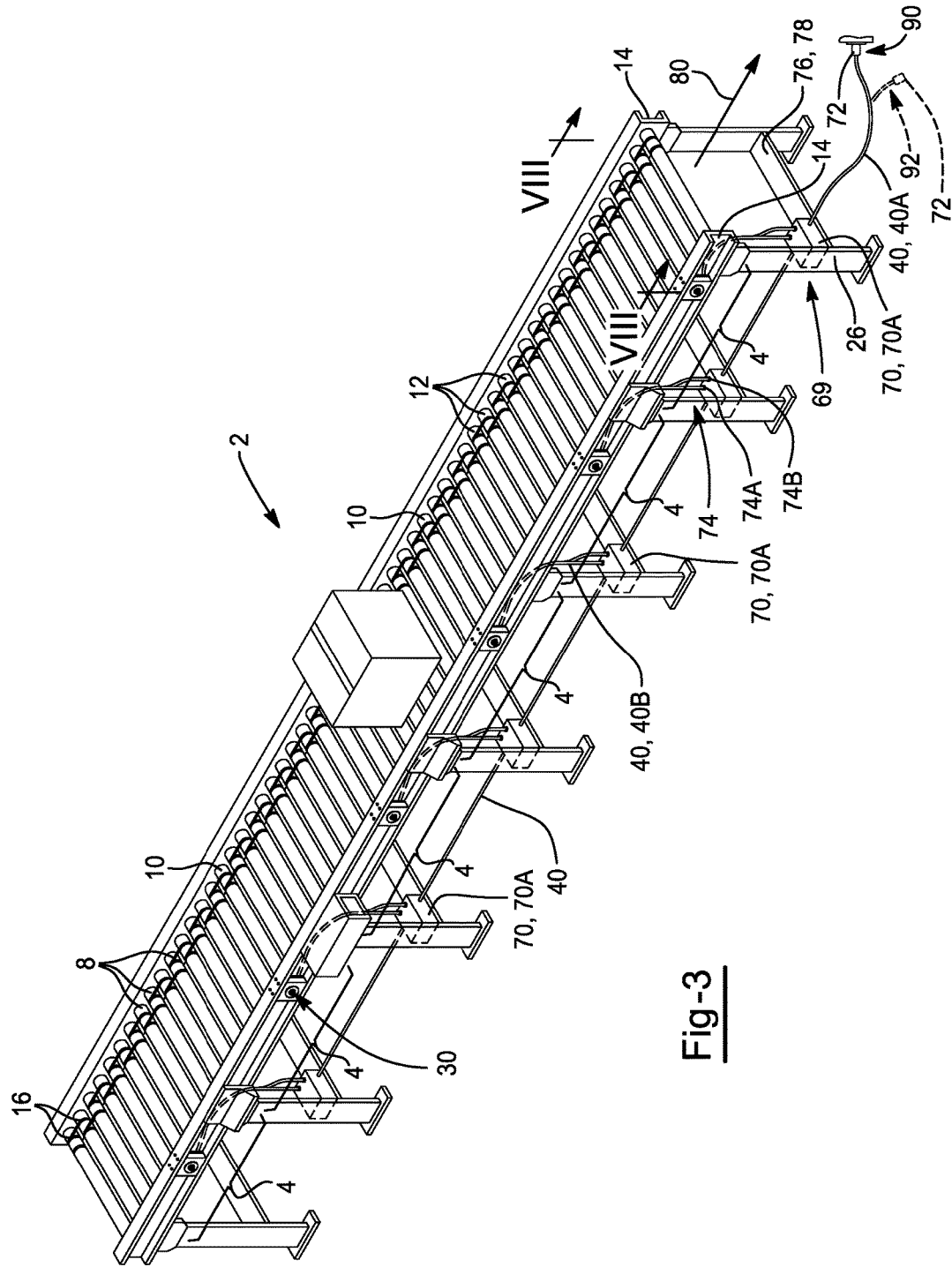
FIG. 3 is a perspective view of a stationary conveyor system including a power storage device and a motor.

FIG. 3 illustrates a conveyor system 2 that is stationary and includes a plurality of rollers 8 located between two frame members 14. The frame members 14 include a plurality of supports 26 that are interconnected by a plurality of stabilizer bars 78 to prevent tipping of the conveyor system 2. The rollers 8 include master rollers 10 directly connected to a gearless motor 30 and slave rollers 12 that are driven by the master rollers 10. The conveyor system 2 includes a plurality of zones 4 with a master roller 10 in the center of each zone 4 so that slave rollers 12 are located on each side of the mater rollers 10. The master rollers 10 move the slave rollers 12 in a direction 80 via one or more transfer devices 16. The stabilizer bars 78 also act as a power storage device support 76 that is connected between the supports 26. A power storage device 70 is located on each of the power storage device supports 76. The power storage devices 70 are a rechargeable battery 70A and include a charging station 69 with charging system circuitry (not shown) to charge the rechargeable battery 70A. The rechargeable batteries 70A include a power storage device output 74 with a positive terminal 74A and a negative terminal 74B that powers the motor 30 through wires 40 that are output wires 40B connected between the power storage device output 74 and the motor 30. One of the rechargeable batteries 70A also includes wires 40 that are input wires 40A and a power storage device input 72 for recharging all of the rechargeable batteries 70A through wires 40 interconnecting the power storage devices 70. The power storage device input 72 is shown in a connected state 90 (connected to a power source), and a disconnected state 92 (e.g., an uninterrupted power supply state). The rechargeable batteries 70A power the motor 30 in both the connected state 90 and disconnected state 92.

Figure 4:
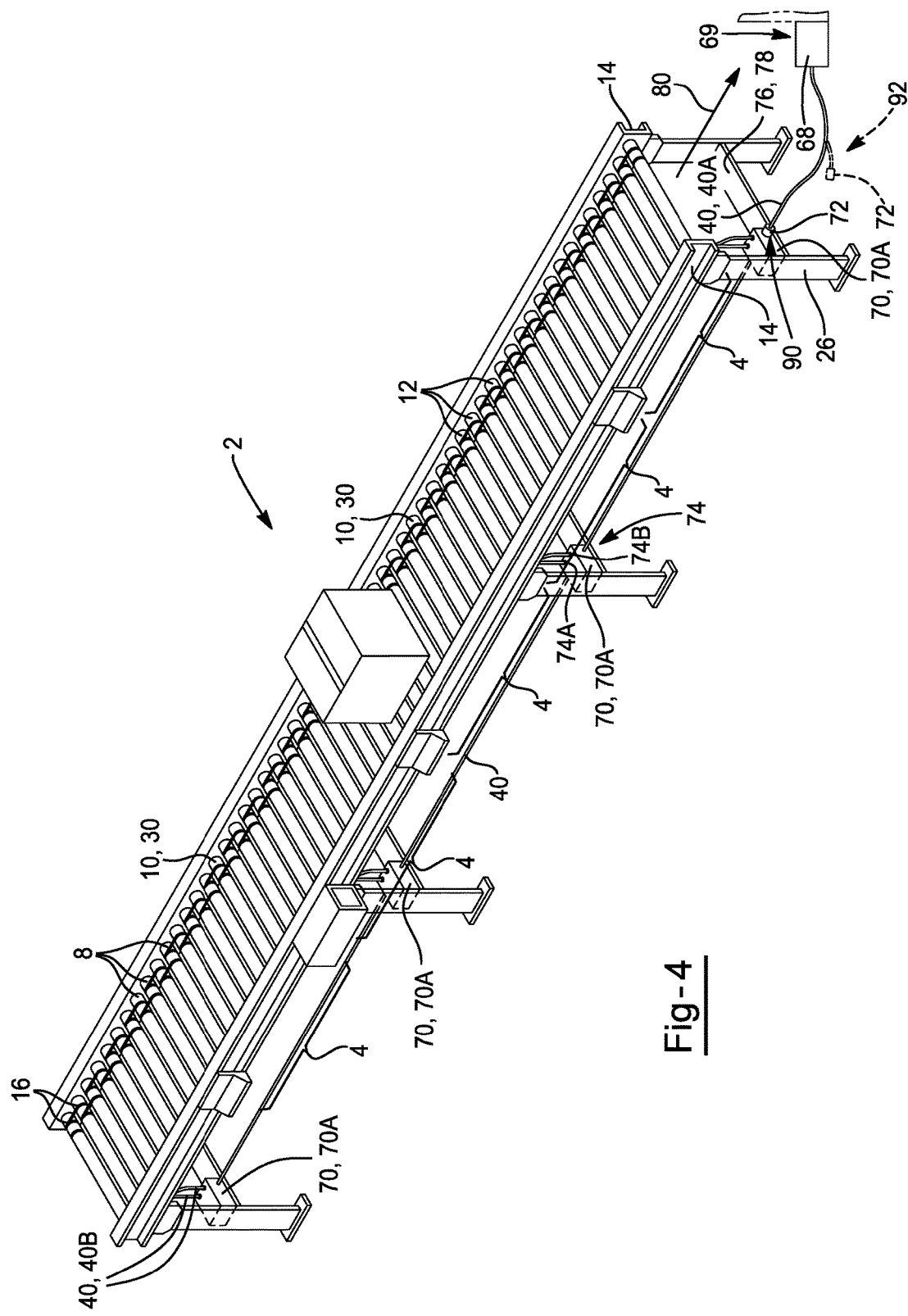
FIG. 4 is a perspective view of a stationary conveyor system including a power storage device and a motor in a shape of a roller.

FIG. 4 illustrates a conveyor system 2 including a plurality of rollers 8 located between two frame members 14. The frame members 14 include a plurality of supports 26 that are interconnected by a plurality of stabilizer bars 78 to prevent tipping of the conveyor system 2. The rollers 8 include master rollers 10 that are connected to slave rollers 12 that are driven by the master rollers 10. A motor 30 in the shape of the master rollers 10 rotates the master roller 10 and subsequently the slave rollers 12 via transfer devices 16. The conveyor system 2 includes a plurality of zones 4 with a master roller 10 in the center of each zone 4 so that slave rollers 12 are located on each side of the master rollers 10. The master rollers 10 move the slave rollers 12 in the direction 80 via the one or more transfer devices 16. The stabilizer bars 78 also act as a power storage device support 76 that is connected between the supports 26. A power storage device 70 is located on each of the power storage device supports 76. The power storage device 70 is a rechargeable battery 70A. The rechargeable batteries 70A include a power storage device output 74 with a positive terminal 74A and a negative terminal 74B that powers the motor 30 through wires 40 that are output wires 40B connected between the power storage device output 74 and the motor 30. One of the rechargeable batteries 70A also includes wires 40 that are input wires 40A and a power storage device input 72 for recharging all of the rechargeable batteries 70A through wires 40 interconnecting the rechargeable batteries 70A. The power storage device input 72 is connected to a charging station 69 that includes charging circuitry 68 by the input wires 40A. The power storage device input 72 extends from the charging station and connects to the rechargeable battery 70A. The power storage device input 72 is shown in a connected state 90 (connected to a power source), and a disconnected state 92 (e.g., an uninterrupted power supply state). The rechargeable batteries 70A power the motors 30 in both the connected state 90 and disconnected state 92.

Figure 5:
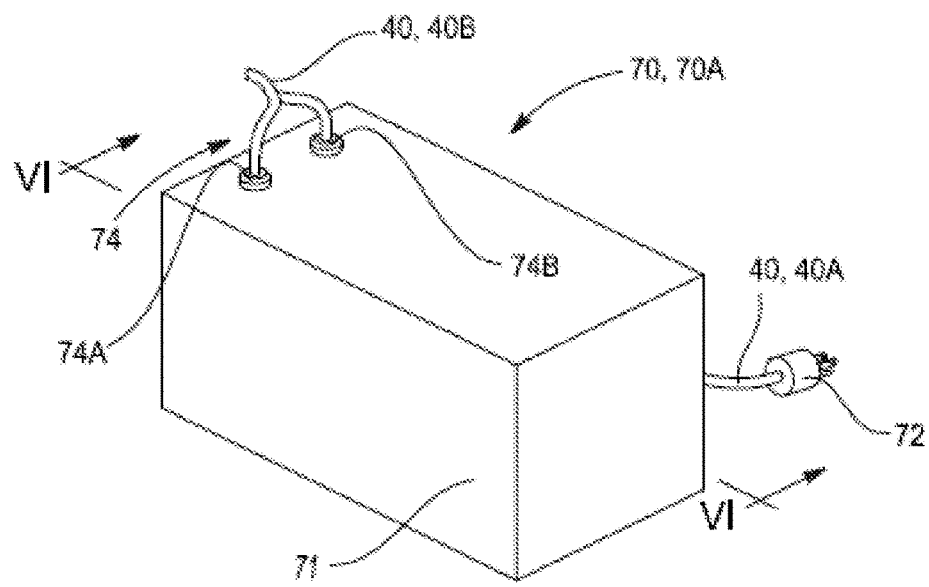
FIG. 5 is a close-up view of a power storage device.

FIG. 5 illustrates a perspective view of a power storage device 70 that is a rechargeable battery 70A. A power storage device housing 71 houses a power module (not shown) and a charging station (not shown). A power storage device output 74 with a positive terminal 74A and a negative terminal 74B powers a motor (not shown) through wires 40 that are output wires 40B connected between the power storage device output 74 and the motor (not shown). The rechargeable battery 70A also includes wires 40 that are input wires 40A and a power storage device input 72 for recharging the rechargeable battery 70A.

Figure 6:
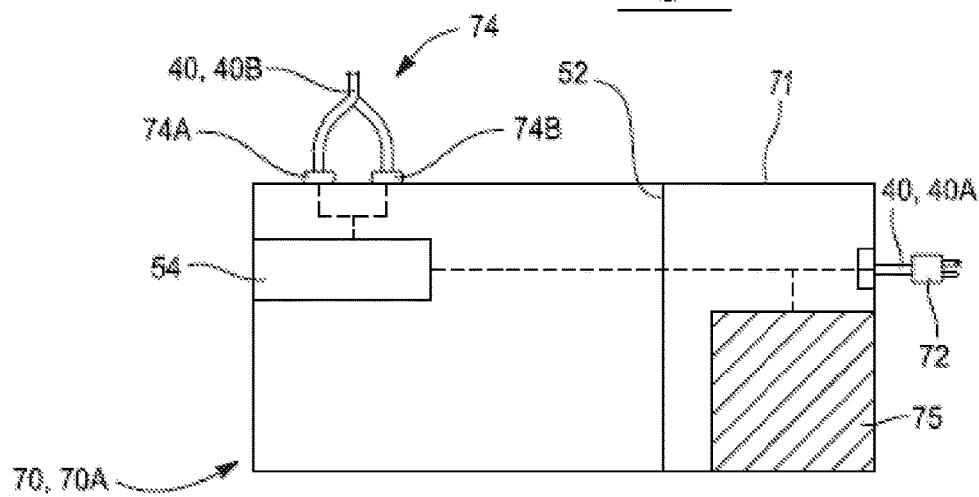
FIG. 6 is a cross-sectional view VI-VI of the power storage device of FIG. 5.

FIG. 6 illustrates a cross-sectional view of FIG. 5 cut along line VI-VI. The rechargeable battery 70A includes a power module 75 housed within a power storage device housing 71. The power module 75 is housed within the power storage device housing 71 and the power storage device 71 includes a separating wall 52. A converter 54 is located within the power storage device. Wires 40 interconnect the power module 75, the controller 41, and the converter 54. A power storage device output 74 with a positive terminal 74A and a negative terminal 74B powers a motor (not shown) through additional wires 40 that are output wires 40B connected between the power storage device output 74 and the motor. The rechargeable battery 70A also includes wires 40 that are input wires 40A and a power storage device input 72 for recharging the power storage device 70. When the power storage device input 72 is connect to a power source such as a wall outlet (not shown), power is fed through the power module 75 to the converter 54, then through the power storage device output 74. While power is being directly fed from an outside power source, the power module 75 is charged. When the power storage device input 72 is disconnected from an outside power source, a controller switches to a power feed directly from the power module 75.

Figure 7:
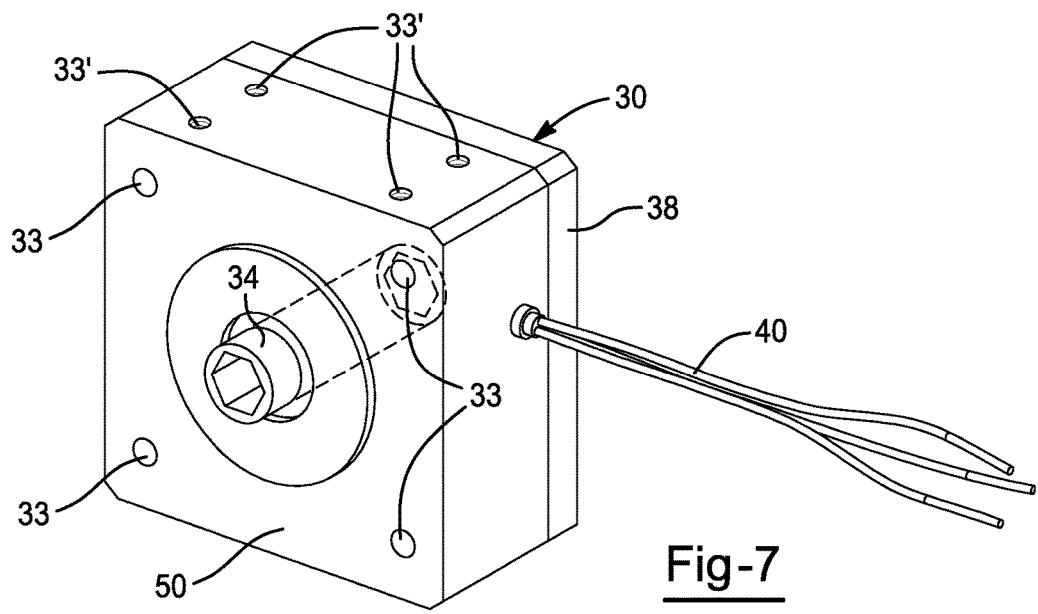
FIG. 7 is a close-up view of a motor.

FIG. 7 illustrates a close-up view of a motor 30 having a motor shaft 34. The motor 30 includes a plurality of wires 40 that provide power to the motor 30. A motor housing 50 includes a plurality of fastener holes 33 and alternative fastener holes 33' that allow the motor 30 to be connected top down or a face of the motor 30 to be connected to the frame (not shown). A motor cover 38 is connected to the motor housing 50 to enclose the motor 30.

Figure 8:
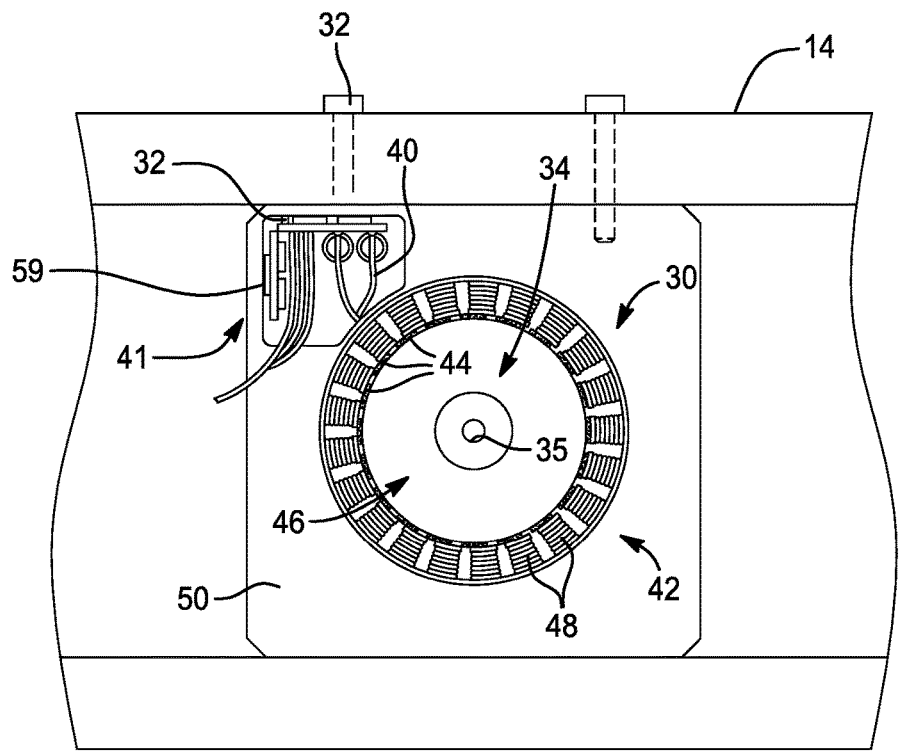
FIG. 8 is a cross-sectional view VIII-VIII of the motor and controller suspended from the frame of FIG. 3.

FIG. 8 illustrates a cross-sectional view of the motor 30 and frame 14 cut along line VIII-VIII of FIG. 3. The motor 30 has the motor cover removed and the motor 30 is connected to the frame 14 in a top down manner by fasteners 32. The motor housing 50 has an internal location that houses both the motor 30 and a controller 41 that is connected to a wall of the motor housing 50 in contact with the frame 14. The controller 41 includes a power switching device 59. The motor 30 includes a stator 42 including a plurality of windings 48 and a rotor 46 including a plurality of magnets 44. A plurality of wires 40 provides power to the windings 48 to drive the rotor 46 and a motor shaft 34 connected to the rotor 46. The motor shaft 34 also includes a shaft cover 35.

Figure 9:
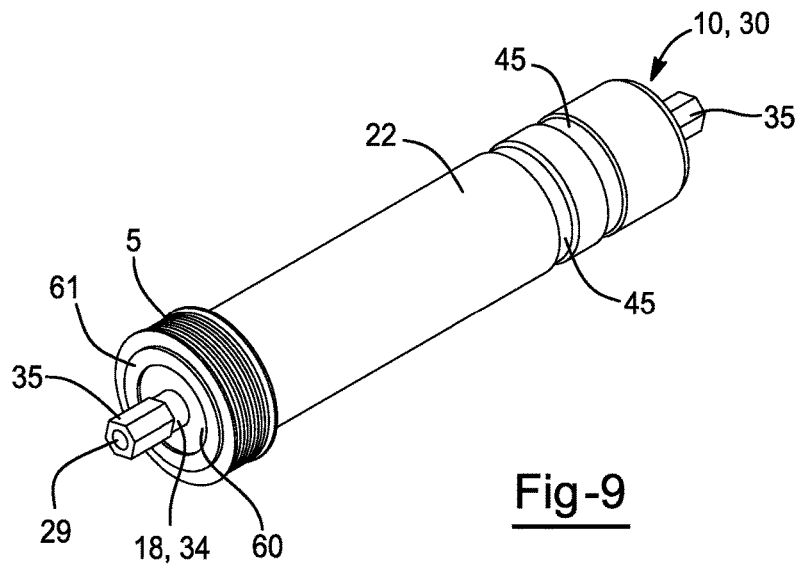
FIG. 9 is a perspective view of a motorized roller that is a master roller.

FIG. 9 illustrates a perspective view of a motor 30 shaped like a roller that is a master roller 10. The master roller 10 includes a hollow roller tube 22. The roller tube 22 includes a plurality of grooves 45 to receive and drive one or more transfer devices, such as an o-ring belt (not shown). An over roller cartridge 5 is located on an outside surface of the hollow roller tube 22 to receive a transfer device such as a v-belt (not shown). The master roller 10 is adapted to receive one or more o-ring belts, one or more v-belts, or a combination of both o-ring belts and v-belts. A hollow roller shaft 18 that is a motor shaft 34 is located within the roller tube 22 and extends longitudinally along an axis of rotation of the master roller 10. The roller shaft 18 includes a shaft cover 35 secured to a proximal end and a shaft cover 35 secured to a distal end. The roller shaft 18 also includes a hole 29 to receive wires (not shown) connected to the motor 30. The shaft 18 is fed through a plurality of bearings 60 encased in a bearing housing 61.

Figure 10:
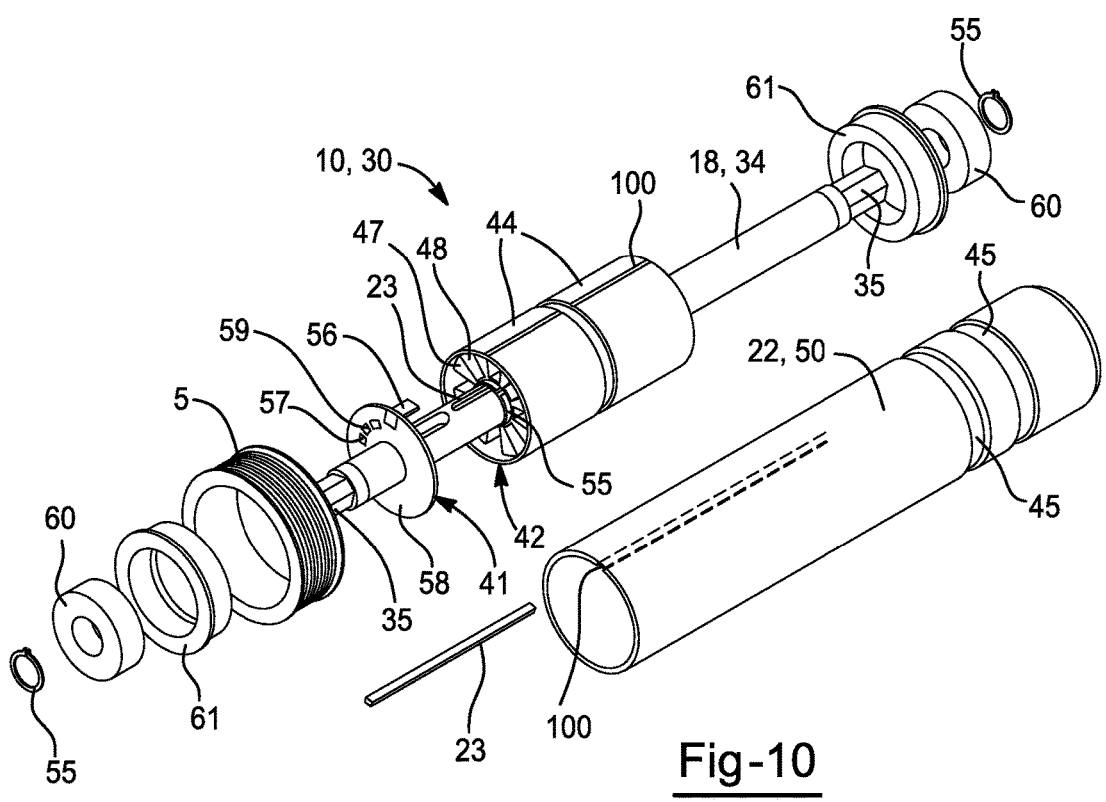
FIG. 10 is an exploded view of a motorized roller that is a master roller.

FIG. 10 illustrates an exploded view of a motor 30 shaped as a roller that is a master roller 10. The motor 30 includes a motor stator 42 surrounded by a plurality of ring magnets 44. The motor stator 42 includes a plurality of motor windings 48 is receiving power through one or more wires (not shown). The motor stator 42 is mounted to a roller shaft 18 that is a motor shaft 34. The motor stator 42 is secured to the roller shaft 18 by a key 23 to stop rotation of the motor stator 42 relative to the roller shaft 18. A controller 41 abuts the motor windings 48 and includes a microprocessor 57, a printed circuit board (PCB) 58, and a power switching device 59. The controller is connected to, and in conjunction with, the motor stator 42 by the wires. A sensor 56 is mounted to the controller 41 and senses the position and the rotational speed of the ring magnets 44. The roller shaft 18 includes a shaft cover 35 secured to a proximal end and a shaft cover 35 secured to a distal end. The shaft 18 is fed through a plurality of bearings 60 encased in a bearing housing 61. A plurality of snap rings 55 secures the bearings 60 from axial movement. An additional snap ring 55 secures the motor stator 42 from axial movement. The ring magnets 44 are located within a roller tube 22 that is a motor housing 50. The roller tube 22 includes a plurality of grooves 45 to receive and drive one or more transfer devices such as an o-ring belt (not shown). An over roller cartridge 5 is located on an outside surface of the hollow roller tube 22 to receive a transfer device such as a v-belt (not shown). The master roller 10 is adapted to receive one or more o-ring belts, one or more v-belts, or a combination of both o-ring and v-belts. A key recess 100 of the ring magnets 44 and a key recess 100 of the roller tube 22 are mated by a key 23 inserted between the key recesses 100 to secure the ring magnets 44 to the roller tube 22.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.
- 2 Conveyor System
- 2A Roller Conveyor
- 2B Belt Conveyor
- 4 Zone
- 5 Over Roller Cartridge
- 8 Rollers
- 10 Master Roller
- 12 Slave Roller
- 14 Frame
- 16 Transfer Device (e.g., belt)
- 16A Flexible Coupling
- 16B Conveyor Belt
- 18 Roller Shaft
- 22 Roller Tube
- 23 Key
- 24 Adhesive
- 26 Support
- 28 Wheel
- 29 Hole
- 30 Motor
- 32 Fastener
- 33 Fastener Holes
- 34 Motor Shaft (hollow shaft)
- 35 Shaft Cover
- 36 Bushing
- 38 Motor Cover
- 39 Gearbox
- 40 Wires
- 40A Input Wires
- 40B Output Wires
- 41 Controller
- 42 Motor Stator
- 44 Ring Magnet
- 45 Groove
- 46 Motor Rotor
- 47 Hub
- 48 Motor Windings
- 50 Motor Housing
- 51 Controller Housing
- 52 Separating Wall
- 53 Motor control electronic circuitry
- 54 Converter
- 55 Snap Ring
- 56 Sensor
- 57 Microprocessor
- 58 Printed Circuit Board (PCB)
- 59 Power Switching Device
- 60 Bearing
- 61 Bearing Housing
- 62 Flexible Sleeve
- 63 Flange Bearing
- 64 Adjustable Portions
- 66 Flexible Sleeve Bearing
- 68 Charging system circuitry
- 69 Charging station
- 70 Power Storage Device
- 70A Rechargeable Battery
- 71 Power Storage Device Housing
- 72 Power Storage Device Input
- 74 Power Storage Device Output
- 74A Positive Terminal
- 74B Negative Terminal
- 75 Power Module
- 76 Power Storage Device Support
- 77 Support Arm
- 78 Stabilizer Bar
- 80 Direction of movement
- 82 Air Flow
- 90 Connected State
- 92 Disconnected State
- 100 Key Recess

I claim:

1. A motorized conveyor system comprising:
    a. one or more electrical motors that create movement in the conveyor system;
    b. one or more rechargeable batteries that power the one or more electrical motors in the conveyor system;
    c. one or more rollers that are driven by the one or more electrical motors;
    d. two frames holding the one or more rollers driven by the one or more electrical motors;
    e. one or more motor control electronic circuitry elements connected to the one or more rechargeable batteries; and
    f. charging system circuitry connected to the one or more rechargeable batteries,
    wherein the one or more electrical motors are a brushless gearless DC motor; and
    wherein the one or more rechargeable batteries are connected to an external fixed power source and the one or more rechargeable batteries are located between the one or more electrical motors and the external fixed power source so that the one or more rechargeable batteries act as an uninterruptible power supply and the one or more rechargeable batteries provide an excess power needed by the one or more electrical motors during peak demands of the one or more electrical motors so power supplied is maintained with a constant voltage or with a voltage above a minimum required voltage.

2. The motorized conveyor system of claim 1, wherein the motorized conveyor system comprises a plurality of modules or zones, each of the one or more electrical motors are located in separate modules or zones of the motorized conveyor system, and all of the one or more electrical motors are powered by a single set of rechargeable batteries; and wherein the separate modules or zones are configured to move the one or more electrical motors at different speeds, a same speed, or both.

3. The motorized conveyor system of claim 1, wherein the two frames are mounted on fixed supports that are positioned on a floor, or the two frames are placed on the floor directly.

4. The motorized conveyor system of claim 1, wherein the two frames are flexible so that the motorized conveyor system can be expanded, contracted, turn, the two frames are fixed, or a combination of both and the motorized conveyor system is on supports that include wheels so that the motorized conveyor system is movable.

5. The motorized conveyor system of claim 1, wherein the one or more electrical motors include a hollow shaft that mates with a shaft of the one or more rollers, or the one or more rollers include a hollow shaft that mates with a shaft of the one or more electrical motors.

6. The motorized conveyor system of claim 4, wherein the motorized conveyor system is disconnectable from an outside power source so that the motorized conveyor system is movable and the motorized conveyor system functions without any cable connection.

7. The motorized conveyor system of claim 1, wherein the one or more rechargeable batteries have a nominal output voltage from about 6 volts to about 480 volts.

8. The motorized conveyor system of claim 1, wherein an input power source to recharge the one or more rechargeable batteries is a direct current (DC) supply, a single phase alternating current (AC) source, a multi-phase power source, a three-phase power source, or a combination thereof.

9. The motorized conveyor system of claim 1, wherein the motorized conveyor system is free of any DC power supply as a source of power to the one or more electrical motors.

10. The motorized conveyor system of claim 1, wherein the motorized conveyor system is a standalone and independent motorized conveyor system that includes one or more modular conveyors or a plurality of different conveyors connected together, the one or more modular conveyors or the plurality of different conveyors having one or more transfer devices, and when the motorized conveyor system is a plurality of different conveyors connected together, the plurality of different conveyors are powered from one set of the one or more rechargeable batteries or a plurality of sets of the one or more rechargeable batteries.

11. The motorized conveyor system of claim 1, wherein the motorized conveyor system is a belt conveyor that moves articles that rest on the belt conveyor.

12. The motorized conveyor system of claim 1, further comprising one or more converters connected to the one or more rechargeable batteries to change a power feed between an external fixed power source and the one or more rechargeable batteries.

13. The motorized conveyor system of claim 1, wherein the one or more rechargeable batteries is a plurality of rechargeable batteries daisy-chained together via wires, and each of the one or more rechargeable batteries is connected to a dedicated charging system.

14. The motorized conveyor system of claim 1, wherein each of the one or more electrical motors are located in separate zones of the motorized conveyor system and powered by a different rechargeable battery; and wherein the separate zones are configured to move the one or more electrical motors at different speeds.

15. The motorized conveyor system of claim 1, wherein the one or more electrical motors are electrically connected to the one or more rechargeable batteries, the one or more rechargeable batteries are electrically connected to the charging system circuitry, and the charging system circuitry is electrically connected to an external power source.

16. The motorized conveyor system of claim 1, wherein the one or more electrical motors are shaped as a roller having an outside member rotating, or the one or more electrical motors include a rotating inner member and have a length less than a diameter of the one or more electrical motors, or a combination thereof.

17. A motorized conveyor system comprising:
  a. one or more electrical motors that create movement in the conveyor system;
  b. one or more rechargeable batteries that power the one or more electrical motors in the conveyor system;
  c. one or more rollers that are driven by the one or more electrical motors;
  d. two frames holding the one or more rollers driven by the one or more electrical motors;
  e. one or more motor control electronic circuitry elements connected to the one or more rechargeable batteries; and
  f. charging system circuitry connected to the one or more rechargeable batteries, wherein the one or more electrical motors are brushless gearless DC motor; and
wherein the one or more rechargeable batteries are housed in one or more power storage devices, and the one or more power storage devices scrub an incoming power source before distributing an outgoing power source to the one or more electrical motors.

18. The motorized conveyor system of claim 17, wherein the incoming power source fluctuates in voltage and the outgoing power source is a constant voltage.

19. The motorized conveyor system of claim 17, wherein the one or more power storage devices convert a voltage of the incoming power source to a different outgoing voltage.

20. The motorized conveyor system of claim 17, wherein the motorized conveyor system comprises a plurality of modules or zones, each of the plurality of modules or zones having one or more rollers, one or more transfer devices, or a combination thereof.

* * * * *